(12) United States Patent
Kwak et al.

(10) Patent No.: US 11,456,782 B2
(45) Date of Patent: Sep. 27, 2022

(54) METHOD FOR TRANSMITTING AND RECEIVING CONTROL INFORMATION IN WIRELESS COMMUNICATION SYSTEM

(71) Applicant: Samsung Electronics Co., Ltd., Suwon-si (KR)

(72) Inventors: Young Woo Kwak, Suwon-si (KR); Hoon Dong Noh, Suwon-si (KR); Cheol Kyu Shin, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/762,309

(22) PCT Filed: Nov. 7, 2018

(86) PCT No.: PCT/KR2018/013484
§ 371 (c)(1),
(2) Date: May 7, 2020

(87) PCT Pub. No.: WO2019/093768
PCT Pub. Date: May 16, 2019

(65) Prior Publication Data
US 2021/0297118 A1    Sep. 23, 2021

(30) Foreign Application Priority Data

Nov. 7, 2017  (KR) .................. 10-2017-0147673

(51) Int. Cl.
| | | |
|---|---|---|
| *H04B 7/0417* | (2017.01) | |
| *H04B 7/0452* | (2017.01) | |
| *H04B 7/0456* | (2017.01) | |
| *H04B 7/06* | (2006.01) | |
| *H04W 72/04* | (2009.01) | |

(52) U.S. Cl.
CPC ......... *H04B 7/0417* (2013.01); *H04B 7/0452* (2013.01); *H04B 7/0486* (2013.01); *H04B 7/0632* (2013.01); *H04B 7/0639* (2013.01); *H04W 72/042* (2013.01); *H04W 72/0453* (2013.01)

(58) Field of Classification Search
CPC .. H04B 7/0417; H04B 7/0639; H04B 7/0632; H04B 7/0452; H04B 7/0486; H04W 72/0453; H04W 72/042
See application file for complete search history.

(56) References Cited

U.S. PATENT DOCUMENTS

2014/0307703 A1 * 10/2014 Gaal .................. H04L 5/0048
370/330

OTHER PUBLICATIONS

International Search Report and Written Opinion dated Feb. 12, 2019, Issued in International Application No. PCT/KR2018/013484.

(Continued)

*Primary Examiner* — Minh Trang T Nguyen
(74) *Attorney, Agent, or Firm* — Jefferson IP Law, LLP

(57) ABSTRACT

The present disclosure relates to a wireless communication system, and a method, performed by a terminal, of transmitting and receiving control information in a wireless communication system according to an embodiment may include receiving, from a base station, an indication of whether to perform dynamic precoding resource block (PRB) bundling through higher layer signaling and, when the dynamic PRB bundling is indicated, dynamically determining a size of a precoding resource block group (PRG) based on downlink control information (DCI).

12 Claims, 25 Drawing Sheets

(56) References Cited

OTHER PUBLICATIONS

3GPP TSG RAN WG1 NR Ad-Hoc#2. InterDigital Inc. PRG Size Indication in NR. R1-1710922. Qingdao, P.R. China Jun. 27-30, 2017.
3GPP ISG-RAN WG1 #89ah-NR. Ericsson. On PRB bundling. R1-1711011 Qingdao, China, Jun. 27-30, 2017.
3GPP TSG RAN WG1 NR Ad-Hoc#3. Huawei, HiSilicon. Codebook based transmission for UL MIMO. R1-1715584. Nagoya, Japan, Sep. 18-21, 2017.
3GPP TSG RAN WG1 Meeting NR#3. InterDigital Inc. On Dynamic PRG Size Configuration in NR. R1-1716464. Nagoya, Japan, Sep. 18-21, 2017.
3GPP TSG RAN WG1 Meeting #90bis. Huawei, HiSilicon. PRB bundling size for DL data precoding. R1-1717297 Prague, Czech Republic, Oct. 9-13, 2017.
3GPP TSG RAN WG1 Meeting #90bix. CATT: 'PRB bundling for DL transmission, R1-1717809, Oct. 8, 2017.
3GPP TSG RAN WG1 #90b VIVO: "Summary of Offline Discussions on DL PRB Bundling", R1-1719072, Oct. 13, 2017.
European Search Report dated Oct. 13, 2020, issued in European Application No. 18877040.8-1205 / 3697012.
Intel Corporation, Study on PRB bundling for NR, R1-1611975, 3GPP TSG RAN WG1 Meeting #87, Reno, US, Nov. 6, 2016.
Samsung, PRB bundling for NR DMRS, R1-1717597, 3GPP TSG RAN WG1 Meeting 90bis, Prague, CZ, Oct. 2, 2017.
Samsung, Considerations on Multi-PRB Support, R1-160552, 3GPP TSG RAN WG1 Meeting #84, St Julian's, Malta, Feb. 5, 2016.
Korean Office Action dated Jan. 17, 2022, issued in Korean Patent Application No. 10-2017-0147673.

\* cited by examiner

FIG. 18

METHOD FOR TRANSMITTING AND RECEIVING CONTROL INFORMATION IN WIRELESS COMMUNICATION SYSTEM

TECHNICAL FIELD

The present disclosure relates to a wireless communication system, and to a method and apparatus for smoothly providing a service in a communication system. More particularly, the present disclosure relates to a method of transmitting and receiving control information in a communication system.

BACKGROUND ART

In order to meet the increasing demand with respect to wireless data traffic after the commercialization of 4th generation (4G) communication systems, efforts have been made to develop improved 5th generation (5G) communication systems or pre-5G communication systems. For this reason, 5G communication systems or pre-5G communication systems are called 'beyond 4G network communication systems' or 'post long term evolution (LTE) systems'. In order to achieve a high data rate, consideration is given to implementing 5G communication systems in millimeter wave (mmW) frequency bands (e.g., 60 GHz bands). In order to reduce propagation path loss and increase a propagation distance in millimeter wave frequency bands, in 5G communication systems, discussions are underway about technologies such as beamforming, massive multiple-input multiple-output (MIMO), full dimensional MIMO (FD-MIMO), array antenna, analog beamforming, and large scale antenna. Also, in order to improve networks of systems, in 5G communication systems, development of technologies such as evolved small cell, advanced small cell, cloud radio access network (cloud RAN), ultra-dense network, device-to-device communication (D2D), wireless backhaul, moving network, cooperative communication, coordinated multi-points (CoMP), and interference cancellation is underway. Furthermore, in 5G communication systems, development of an advanced coding modulation (ACM) scheme such as hybrid frequency-shift keying (FSK) and quadrature amplitude modulation (QAM) modulation (FQAM) or sliding window superposition coding (SWSC) and an enhanced network access scheme such as filter bank multi carrier (FBMC), non-orthogonal multiple access (NOMA), or sparse code multiple access (SCMA), is underway.

The Internet is evolving from a human-centered connection network through which humans create and consume information to an Internet of Things (IoT) network through which distributed elements such as objects exchange and process information. Internet of Everything (IoE) technology, which is a combination of IoT technology and big data processing technology through connection with a cloud server, is also emerging. In order to implement the IoT, technology elements such as sensing technology, wired/wireless communication and network infrastructure, service interface technology, and security technology are required, and thus technology for inter-object connection, such as a sensor network, machine to machine (M2M) communication, or machine-type communication (MTC), has recently been studied. In an IoT environment, intelligent Internet technology (IT) services that collect and analyze data generated by connected objects and create new value in human life may be provided. The IoT may be applied to fields such as smart homes, smart buildings, smart cities, smart cars or connected cars, smart grids, health care, smart home appliances, and advanced medical services through convergence and integration of existing information technology (IT) and various industries.

Various attempts have been made to apply 5G communication systems to IoT networks. For example, technology such as sensor network, M2M communication, or MTC is implemented by 5G communication technology such as beamforming, MIMO, or array antenna. The application of a cloud RAN as big data processing technology may also be considered as an example of convergence of 3eG technology and IoT technology.

Because wireless communication systems may provide various services due to the development of the wireless communication systems, there is a demand for methods of smoothly providing such services.

DESCRIPTION OF EMBODIMENTS

Technical Problem

Disclosed embodiments may provide a method and apparatus for transmitting and receiving control information to smoothly provide a service in a wireless communication system.

Solution to Problem

A method, performed by a terminal, of transmitting and receiving control information in a wireless communication system according to an embodiment may include receiving, from a base station, an indication of whether to perform dynamic precoding resource block (PRB) bundling through higher layer signaling, and, when the dynamic PRB bundling is indicated, dynamically determining a size of a precoding resource block group (PRG) based on downlink control information (DCI).

Advantageous Effects of Disclosure

According to an embodiment, a service may be smoothly provided in a wireless communication system.

BRIEF DESCRIPTION OF DRAWINGS

FIGS. 17 and 18 are diagrams illustrating a demodulation reference signal (DMRS) pattern that may be supported in a 5G or NR system.

BEST MODE

Figure 1:
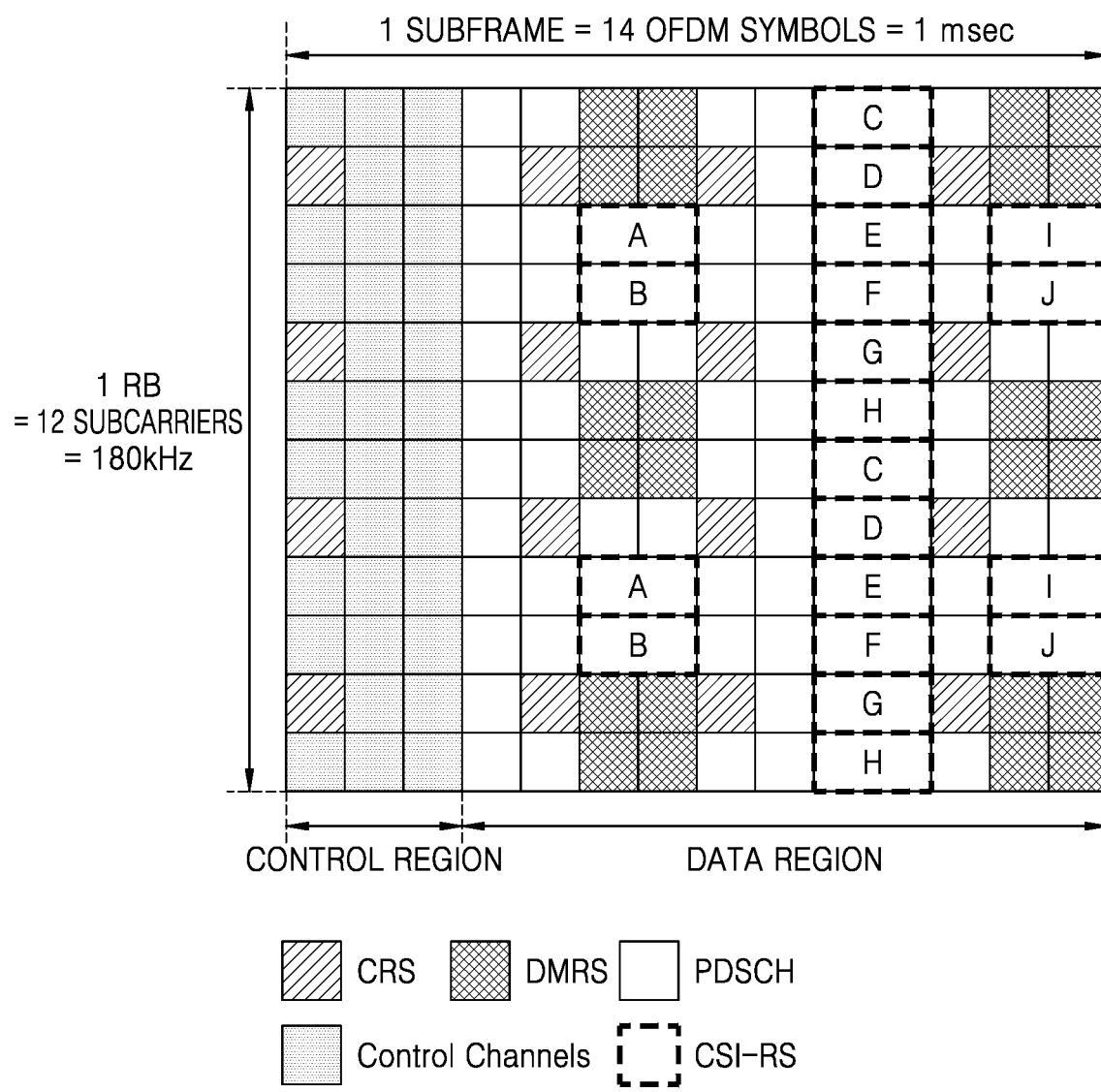
FIG. 1 is a diagram illustrating a configuration of a time-frequency domain that is a downlink radio resource region of a long term evolution (LTE) system, an LTE-advanced (LTE-A) system, or a similar system.

A method, performed by a terminal, of transmitting and receiving control information in a wireless communication system may include: receiving, from a base station, an indication of whether to perform dynamic precoding resource block (PRB) bundling through higher layer signaling; and when the dynamic PRB bundling is indicated, dynamically determining a size of a precoding resource block group (PRG) based on downlink control information (DCI).

In an embodiment, the dynamic determining of the size of the PRG may include, when a value of a DCI field related to the size of the PRG is 1, determining the size of the PRG according to a size of a bandwidth part allocated to receive data.

In an embodiment, the determining of the size of the PRG according to the size of the bandwidth part may include: when the size of the bandwidth part is greater than a threshold value, determining the size of the PRG to be the same size as a scheduled bandwidth, and when the size of the bandwidth part is equal to or less than the threshold value, determining the size of the PRG to be 2 PRBs or 4 PRBs.

In an embodiment, the threshold value may be a pre-set value.

In an embodiment, the dynamically determining of the size of the PRG may include, when a value of a DCI field related to the size of the PRG is 0, determining the size of the PRG to be one of 2 PRBs, 4 PRBs, and the same size as a scheduled bandwidth.

A method, performed by a base station, of transmitting and receiving control information in a wireless communication system according to an embodiment may include: transmitting, to a terminal, an indication of whether to perform dynamic precoding resource block (PRB) bundling through higher layer signaling; and dynamically indicating a size of a precoding resource block group (PRG) to the terminal through downlink control information (DCI).

In an embodiment, the dynamic determining of the size of the PRG may include indicating the size of the PRG according to a size of a bandwidth part allocated to receive data, by setting a value of a DCI field related to the size of the PRG to 1.

In an embodiment, the indicating of the size of the PRG according to the size of the bandwidth part may include: when the size of the bandwidth part is greater than a threshold value, indicating the size of the PRG to be the same size as a scheduled bandwidth; and when the size of the bandwidth part is equal to or less than the threshold value, indicating the size of the PRG to be 2 PRBs or 4 PRBs.

In an embodiment, the threshold value may be a pre-set value.

In an embodiment, the dynamic indicating of the size of the PRG may include indicating the size of the PRG to be one of 2 PRBs, 4 PRBs, and the same size as a scheduled bandwidth, by setting a value of a DCI field related to the size of the PRG to 0.

A terminal for transmitting and receiving control information in a wireless communication system according to an embodiment may include: a transceiver; at least one memory storing a program for transmitting and receiving control information; and a processor configured to receive, from a base station, an indication of whether to perform dynamic precoding resource block (PRB) bundling through higher layer signaling, and when the dynamic PRB bundling is indicated, dynamically determine a size of a precoding resource block group (PRG) based on downlink control information (DCI).

In an embodiment, when a value of a DCI field related to the size of the PRG is 1, the processor may be further configured to determine the size of the PRG according to a size of a bandwidth part allocated to receive data.

In an embodiment, the processor may be further configured to, when the size of the bandwidth part is greater than a threshold value, determine the size of the PRG to be the same size as a scheduled bandwidth, and when the size of the bandwidth part is equal to or less than the threshold value, determine the size of the PRG to be 2 PRBs or 4 PRBs.

In an embodiment, the threshold value may be a pre-set value.

In an embodiment, when a value of a DCI field related to the size of the PRG is 0, the processor may be further configured to determine the size of the PRG to be one of 2 PRBs, 4 PRBs, and the same size as a scheduled bandwidth.

A base station for transmitting and receiving control information in a wireless communication system according to an embodiment may include: a transceiver; at least one memory storing a program for transmitting and receiving control information; and a processor configured to transmit, to a terminal, an indication of whether to perform dynamic precoding resource block (PRB) bundling through higher layer signaling, and dynamically indicate a size of a precoding resource block group (PRG) to the terminal through downlink control information (DCI).

In an embodiment, the processor may be further configured to indicate the size of the PRG according to a size of a bandwidth part allocated to receive data, by setting a value of a DCI field related to the size of the PRG to 1.

In an embodiment, the processor may be further configured to, when the size of the bandwidth part is greater than a threshold value, indicate the size of the PRG to be the same size as a scheduled bandwidth, and when the size of the bandwidth part is equal to or less than the threshold value, indicate the size of the PRG to be 2 PRBs or 4 PRBs.

In an embodiment, the threshold value may be a pre-set value.

In an embodiment, the processor may be further configured to indicate the size the PRG to be one of 2 PRBs, 4 PRBs, and the same size as a scheduled bandwidth, by setting a value of a DCI field related to the size of the PRG to 0.

MODE OF DISCLOSURE

Hereinafter, embodiments of the present disclosure will be described in detail with reference to the attached drawings.

While describing embodiments of the present disclosure, descriptions of techniques that are well known in the art and not directly related to the present disclosure are omitted. This is to clearly convey the points of the present disclosure by omitting an unnecessary explanation.

For the same reason, some elements in the attached drawings are exaggerated, omitted, or schematically illustrated. Also, a size of each element does not entirely reflect a real size of the element. In the drawings, the same or corresponding elements are denoted by the same reference numerals.

The advantages and features of the present disclosure and methods of achieving them will become apparent with reference to embodiments of the present disclosure described in detail below along with the attached drawings. The present disclosure may, however, be embodied in many different forms and should not be construed as limited to embodiments of the present disclosure set forth herein; rather these embodiments of the present disclosure are provided so that this disclosure will be thorough and complete, and will fully convey the scope of the present disclosure to one of ordinary skill in the art, and the scope of the present disclosure is defined only by the accompanying claims. In the specification, the same reference numerals denote the same elements.

It will be understood that each block of flowchart illustrations and combinations of blocks in the flowchart illustrations may be implemented by computer program instructions. Because these computer program instructions may be loaded into a processor of a general-purpose computer, special purpose computer, or other programmable data processing apparatus, the instructions, which are executed via the processor of the computer or other programmable data processing apparatus generate means for implementing the functions specified in the flowchart block(s). Because these computer program instructions may also be stored in a computer usable or computer-readable memory that may direct a computer or other programmable data processing apparatus to function in a particular manner, the instructions stored in the computer usable or computer-readable memory may produce an article of manufacture including instruction means that implement the functions specified in the flowchart block(s). Because the computer program instructions may also be loaded onto a computer or other programmable data processing apparatus, a series of operational steps may be performed on the computer or other programmable apparatus to produce a computer implemented process, and thus the instructions executed on the computer or other programmable apparatus may provide steps for implementing the functions specified in the flowchart block(s).

In addition, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

The term "~ unit" used in the present embodiment refers to a software or hardware component, such as a field-programmable gate array (FPGA) or an application-specific integrated circuit (ASIC), which performs certain tasks. However, "~ unit" does not mean to be limited to software or hardware. The term "~ S unit" may be configured to be in an addressable storage medium or configured to operate one or more processors. Thus, "~ unit" may include, by way of example, components, such as software components, object-oriented software components, class components, and task components, processes, functions, attributes, procedures, subroutines, segments of program code, drivers, firmware, microcode, circuitry, data, databases, data structures, tables, arrays, and variables. The functionality provided in components and "~ units" may be combined into fewer components and "~ units" or further separated into additional components and "~ units". Further, components and "~ units" may be implemented to operate one or more central processing units (CPUs) in a device or a secure multimedia card. Also, a unit may include one or more processors in an embodiment.

Wireless communication systems have been developed from wireless communication systems providing voice centered services in the early stage toward broadband wireless communication systems providing high-speed, high-quality packet data services, such as communication standards of high speed packet access (HSPA), long term evolution (LTE or evolved universal terrestrial radio access (E-UTRA)), and LTE-advanced (LTE-A) of the 3rd generation partnership project (3GPP), high rate packet data (HRPD) and ultra mobile broadband (UMB) of the 3GPP2, and 802.16e and 802.16m of the Institute of Electrical and Electronics Engineers (IEEE). Also, a communication standard of 5th generation (5G) or new radio (NR) is being developed as a 5G wireless communication system.

An LTE system that is a representative example of the broadband wireless communication system has adopted an orthogonal frequency division multiplexing (OFDM) scheme in a downlink (DL) and has adopted a single carrier frequency division multiple access (SC-FDMA) scheme in an uplink (UL). The uplink refers to a wireless link through which a user equipment (UE) or a mobile station (MS) transmits data or a control signal to a next generation NodeB (gNB) or a base station (BS), and the downlink refers to a wireless link through which a gNB transmits data or a control signal to a terminal. The multiple access scheme as described above normally allocates and operates time-frequency resources including data or control information to be transmitted to each other to prevent the time-frequency resources from overlapping with each other, that is, establish orthogonality, thereby distinguishing the data or the control information of each user.

Existing 3rd generation (3G) evolution mobile communication systems, such as LTE, UMB, and 802.16m, are based on a multi-carrier multiple access scheme, apply multiple-input multiple-output (MIMO) to improve transmission efficiency, and use various technologies, such as beamforming, adaptive modulation and coding (AMC), and channel sensitive scheduling. The various technologies enhance transmission efficiency and improve system throughput through a method of concentrating transmission power that is transmitted from multiple antennas or adjusting the amount of transmitted data based on channel quality or the like, and selectively transmitting data to a user having good channel quality. Most of those schemes are operated based on channel state information of a channel between a base station (which may be interchangeably used with a next generation node B (gNB) or a base station (BS)) and a terminal (which may be interchangeably used with a user equipment (UE) or a mobile station (MS)), and thus, the gNB or the UE may need to measure a channel state between the base station and the terminal, and in this instance, a channel state information reference signal (CSI-RS) is used. The gNB indicates a downlink transmission and uplink reception device located in a predetermined place, and one gNB performs transmission/reception on a plurality of cells. In a single mobile communication system, a plurality of gNBs are geographically distributed and each of the gNBs performs transmission/reception on a plurality of cells.

Existing 3rd generation (3G) and 4th generation (4G) mobile communication systems such as LTE/LTE-A utilize MIMO technology that executes transmission using a plurality of transmission and reception antennas to improve a data rate and system throughput. The MIMO technology utilizes a plurality of transmission and reception antennas in order to spatially separate a plurality of information streams when the information streams are transmitted. Spatially separating and transmitting a plurality of information streams is referred to as spatial multiplexing. Generally, the number of information streams to which spatial multiplexing may be applied may vary according to the number of antennas included in a transmitter and a receiver. Generally, the number of information streams to which spatial multiplexing may be applied is referred to as a rank of corresponding transmission. In MIMO technology supported in the standards up to LTE/LTE-A Release 11, spatial multiplexing of a case where the number of transmitting antennas and the number of reception antennas are respectively 16 and 8 is supported, and a rank of up to 8 is supported.

The design purpose of NR systems that are 5G mobile communication systems currently under discussion is to support various services such as enhanced mobile broadband (eMBB), massive machine type communications (mMTC), and ultra-reliable and low-latency communications (URLLC), and for the purpose, time and frequency resources may be flexibly used by allowing transmission of reference signals that are always transmitted to be minimized and aperiodically performed.

The terms used herein are those defined in consideration of functions in the present disclosure, but the terms may vary according to the intention of users or operators, precedents, etc. Therefore, the terms used herein have to be defined based on the meaning of the terms together with the description throughout the specification. Hereinafter, a base station is an entity performing resource allocation for a terminal and may include at least one of a gNode B, an eNode B, a Node B, a base station (BS), a radio access unit, a base station controller, or a node on a network. A terminal may include a user equipment (UE), a mobile station (MS), a cellular phone, a smartphone, a computer, or a multimedia system capable of performing a communication function. In the present disclosure, a downlink (DL) refers to a path for wireless transmission of signals from a base station to a terminal, and an uplink (UL) refers to a path for wireless transmission of signals from a terminal to a base station. In addition, although embodiments of the present disclosure are described hereinafter by taking an LTE/LTE-A system as an example, the embodiments of the present disclosure may also be applied to other communication systems having similar technical backgrounds or channel types. For example, the embodiments of the present disclosure may be applied to 5G mobile communication technology (e.g., 5G new radio (NR)) developed after LTE-A. Further, the embodiments of the present disclosure may also be applied to other communication systems by making some changes or modifications therein without departing from the spirit and scope of the present disclosure.

Particularly, the terms "physical channel" and "signal" in conventional LTE or LTE-A systems may be used to describe a method and apparatus according to the present disclosure. However, embodiments of the present disclosure may be applied to wireless communication systems rather than LTE and LU-A systems.

Further, embodiments of the present disclosure may be applied to frequency-division duplexing (FDD) and time-division duplexing (TDD) systems.

Hereinafter, in the present disclosure, physical layer signaling is a method of transmitting a signal from the base station to a terminal through a downlink control channel of a physical layer or from the terminal to the base station through an uplink control channel of a physical layer, and may be referred to as L1 signaling or PHY signaling.

In the present disclosure, higher signaling or higher layer signaling is a method of transmitting a signal from a base station to a terminal through a downlink data channel of a physical layer or from the terminal to the base station through an uplink data channel of a physical layer, and may be referred to as radio resource control (RRC) signaling, L2 signaling, packet data convergence protocol (PDCP) signaling, or a medium access control element (MAC CE).

In the present disclosure, DCI, uplink (UL) DCI, or UL-related DCI is physical layer control signaling (L1 control) including information required for uplink transmission, such as uplink resource configuration information and resource configuration type information, such as UL grant, uplink power control information, cyclic shift of an uplink reference signal, an orthogonal cover code (OCC), a channel state information (CSI) request, a sounding reference signal (SRS) request, modulation and coding scheme (MCS) information for each codeword, and an uplink precoding information field.

Although the present disclosure provides descriptions of an NR system, an LTE system, and an LTE-A system, the present disclosure may be applied to other communication systems using a licensed band and an unlicensed band, without any modification thereto.

FIG. 1 is a diagram illustrating a configuration of a time-frequency domain that is a downlink radio resource region of an LTE system, an LTE-A system, or a similar system.

Referring to FIG. 1, a time axis of a radio resource region includes one subframe including 14 OFDM symbols, and a frequency axis includes one resource block (RB) including 12 subcarriers. Accordingly, the radio resource region may have a total of 168 unique frequency and time locations. In LTE and LTE-A systems, each unique frequency-time location of FIG. 1 is referred to as a resource element (RE).

Referring to FIG. 1, the following signals may be transmitted in the radio resource region.

1) Cell-specific RS (CRS): The CRS is a reference signal periodically transmitted for all terminals belonging to one cell, and may be commonly used by a plurality of terminals.

2) Demodulation reference signal (DMRS): The DMRS is a reference signal transmitted for a specific terminal, and is transmitted only when data is transmitted to the specific terminal. The DMRS may include a total of 8 DMRS ports. In LTE and LTE-A systems, ports from port 7 to port 14 are DMRS ports, and ports maintain orthogonality in order to prevent interference therebetween using code division multiplexing (CDM) or frequency division multiplexing (FDM).

3) Physical downlink shared channel 120 (PDSCH): The PDSCH is a data channel transmitted in a downlink, is used when a base station transmits traffic to a terminal, and is transmitted by using an RE in which a reference signal is not transmitted in a data region 308 of the radio resource region.

4) CSI-RS: The CSI-RS is a reference signal transmitted for terminals belonging to one cell and is used to measure a channel state. A plurality of CSI-RSs may be transmitted in a single cell.

5) Other control channels (physical hybrid ARQ indicator channel (PHICH), physical control format indicator channel (PCFICH), and physical downlink control channel (PDCCH)): The control channels are used to provide control information that is necessary for a terminal to receive a PDSCH or to transmit acknowledgement/negative acknowledgment (ACK/NACK) for operating a hybrid automatic repeat request (HARQ) for uplink data transmission, and the control channels are transmitted by using a control region 306 of the radio resource region.

In an LTE-A system, muting may be configured so that CSI-RSs transmitted by other base stations may be received by terminals of a corresponding cell without interference. Muting may be applied at a location where a CSI-RS may be transmitted, and a terminal may jump over a corresponding radio resource and may receive a traffic signal. In the LTE-A system, muting is also referred to as a zero-power CSI-RS. This is because, due to the characteristics of muting, muting is applied to a location of a CSI-RS and transmission power is not transmitted.

In FIG. 1, a CSI-RS may be transmitted using some of locations expressed as A, B, C, D, E, F, G, H, I, and J according to the number of antennas that transmit the CSI-RS. Also, muting may be applied to some of the locations expressed as A, B, C, D, E, F, G, H, I, and J. Particularly, the CSI-RS may be transmitted using 2, 4, and 8 REs, according to the number of antenna ports that execute transmission. For example, when the number of antenna ports is 2, the CSI-RS may be transmitted to a half of a specific pattern in FIG. 1, and when the number of antenna ports is 4, the CSI-RS may be transmitted to the whole of the specific pattern. Also, when the number of antennas ports is 8, the CSI-RS may be transmitted using two patterns.

In contrast, muting is always composed of one pattern unit. That is, muting may be applied to a plurality of patterns, but may not be applied to a part of a single pattern when a location of the muting does not overlap a location of the CSI-RS. However, only in the case where a location of muting and a location of the CSI-RS overlap, the muting may be applied to only a part of a single pattern. When a CSI-RS for antenna ports is transmitted, the CSI-RS may transmit signals of respective antenna ports through two REs that are connected together on a time axis, and the signals of the antenna ports may be distinguished by orthogonal codes. When a CSI-RS for four antenna ports is transmitted, signals for two additional antenna ports may be transmitted in the same method further using two REs added to a CSI-RS for two antenna ports. Transmission of a CSI-RS for 8 antenna ports is performed in the same manner. When a CSI-RS supports 12 antenna ports and 16 antenna ports, the CSI-RS may be transmitted by combining three CSI-RS transmission locations for four existing antenna ports, or combining two CSI-RS transmission locations for eight antenna ports.

Also, a terminal may be allocated a CSI-interference measurement (IM) resource (or an interference measurement resource (IMR)) together with a CSI-RS, and the CSI-IM resource has the same resource structure and location as those of the CSI-RS supporting 4 ports. The CSI-IM is a resource in order for a terminal that receives data from one or more base stations to accurately measure interference from an adjacent base station. For example, when the terminal desires to measure the amount of interference when the adjacent base station transmits data and the amount of interference when the adjacent base station does not transmit data, the base station may configure a CSI-RS and two CSI-IM resources. In this case, the amount of interference exerted by the adjacent base station may be effectively measured in a manner that the adjacent base station always transmits a signal in one CSI-IM whereas the adjacent base station is prevented from always transmitting a signal in the other CSI-IM.

Table 1 shows a radio resource control (RRC) configuration field for a CSI-RS configuration.

TABLE 1

| RRC configuration for supporting periodic CSI-RS in CSI process. | | | |
|---|---|---|---|
| CSI-RS config | CSI-IM config | CQI report config | Etc |
| No. antenna ports<br>Resource config<br>  Time and frequency<br>  position in a subframe<br>Subframe config<br>  Periodicity and subframe<br>  offset<br>Qcl-CRS-info (QCL<br>Type B)<br>  CRS information for CoMP | Resource config<br>  Time and frequency<br>  position in a subframe<br>Subframe config<br>  Periodicity and subframe<br>  offset | Periodic<br>  Mode, resource,<br>  periodicity, offset . . .<br>Aperiodic<br>  Mode . . .<br>PMI/RI report<br>RI reference CSI<br>process<br>SubframePattern | $P_c$<br>Codebook subset<br>restriction |

Configuration for channel state reporting based on a periodic CSI-RS in a CSI process may be classified into four types, as shown in Table 1. CSI-RS config is to configure frequency and time locations of a CSI-RS RE. The number of ports which the corresponding CSI-RS has may be configured through configuration of the number of antennas. Resource config configures an RE location in an RB, and Subframe config configures a period and an offset of a subframe.

Table 2 is for configuration of Resource config and Subframe config currently supported in LTE.

ration includes a periodic channel state reporting configuration, an aperiodic channel state reporting configuration, a precoding matrix index (PMI)/rank indicator (RI) reporting configuration, an RI reference CSI process configuration, and a subframe pattern configuration.

A subframe pattern is to configure a measurement subframe subset for supporting measurement of channels and interference having temporally different characteristics in measuring channels and interference received by a terminal. The measurement subframe subset was first introduced in the enhanced inter-cell interference coordination (eICIC) in

TABLE 2

Configuration of Resource config and Subframe config

|  |  | Number of CSI reference signals configured | | | | | |
|---|---|---|---|---|---|---|---|
| CSI reference signal | | 1 or 2 | | 4 | | 8 | |
| | configuration | (k', l') | $n_s$ mod 2 | (k', l') | $n_s$ mod 2 | (k', l') | $n_s$ mod 2 |
| Frame structure type 1 and 2 | 0 | (9, 5) | 0 | (9, 5) | 0 | (9, 5) | 0 |
| | 1 | (11, 2) | 1 | (11, 2) | 1 | (11, 2) | 1 |
| | 2 | (9, 2) | 1 | (9, 2) | 1 | (9, 2) | 1 |
| | 3 | (7, 2) | 1 | (7, 2) | 1 | (7, 2) | 1 |
| | 4 | (9, 5) | 1 | (9, 5) | 1 | (9, 5) | 1 |
| | 5 | (8, 5) | 0 | (8, 5) | 0 | | |
| | 6 | (10, 2) | 1 | (10, 2) | 1 | | |
| | 7 | (8, 2) | 1 | (8, 2) | 1 | | |
| | 8 | (6, 2) | 1 | (6, 2) | 1 | | |
| | 9 | (8, 5) | 1 | (8, 5) | 1 | | |
| | 10 | (3, 5) | 0 | | | | |
| | 11 | (2, 5) | 0 | | | | |
| | 12 | (5, 2) | 1 | | | | |
| | 13 | (4, 2) | 1 | | | | |
| | 14 | (3, 2) | 1 | | | | |
| | 15 | (2, 2) | 1 | | | | |
| | 16 | (1, 2) | 1 | | | | |
| | 17 | (0, 2) | 1 | | | | |
| | 18 | (3, 5) | 1 | | | | |
| | 19 | (2, 5) | 1 | | | | |
| Frame structure type 2 only | 20 | (11, 1) | 1 | (11, 1) | 1 | (11, 1) | 1 |
| | 21 | (9, 1) | 1 | (9, 1) | 1 | (9, 1) | 1 |
| | 22 | (7, 1) | 1 | (7, 1) | 1 | (7, 1) | 1 |
| | 23 | (10, 1) | 1 | (10, 1) | 1 | | |
| | 24 | (8, 1) | 1 | (8, 1) | 1 | | |
| | 25 | (6, 1) | 1 | (6, 1) | 1 | | |
| | 26 | (5, 1) | 1 | | | | |
| | 27 | (4, 1) | 1 | | | | |
| | 28 | (3, 1) | 1 | | | | |
| | 29 | (2, 1) | 1 | | | | |
| | 30 | (1, 1) | 1 | | | | |
| | 31 | (0, 1) | 1 | | | | |

| CSI-RS-SubframeConfig $I_{CSI-RS}$ | CSI-RS periodicity $T_{CSI-RS}$ (subframes) | CSI-RS subframe offset $\Delta_{CSI-RS}$ (subframes) |
|---|---|---|
| 0-4 | 5 | $I_{CSI-RS}$ |
| 5-14 | 10 | $I_{CSI-RS}$ − 5 |
| 15-34 | 20 | $I_{CSI-RS}$ − 15 |
| 35-74 | 40 | $I_{CSI-RS}$ − 35 |
| 75-154 | 80 | $I_{CSI-RS}$ − 75 |

(a) Configuration of Resource config
(b) Configuration of Subframe config

A terminal may check frequency and time locations, a period, and an offset via Table 2. Quasi-colocated (Qcl)-CRS-info configures quasi co-location information for coordinated multi-points (CoMP). CSI-IM config is to configure frequency and time locations of CSI-IM for interference measurement. Because CSI-IM is always configured based on 4 ports, it is not necessary to configure the number of antenna ports, and Resource config and Subframe config are configured in the same manner as a CSI-RS. CQI report config is to configure how to report a channel state, by using a corresponding CSI process. The corresponding configuorder to perform estimation in view of other interference characteristics of an almost-blank subframe (ABS) and a general non-ABS subframe. The measurement subframe subset has evolved into a form that configures two IMRs to measure different channel characteristics of a subframe that always functions as a DL and a subframe that may be dynamically switched from a DL to a UL in enhanced interference mitigation and traffic adaptation (eIMTA). Tables 3 and 4 respectively show measurement subframe subsets for supporting eICIC and eIMTA.

TABLE 3

Configuration of measurement subframe subset for supporting eICIC

```
CQI-ReportConfig-r10 ::= SEQUENCE {
  cqi-ReportAperiodic-r10        CQI-ReportAperiodic-r10     OPTIONAL, -- Need ON
  nomPDSCH-RS-EPRE-Offset        INTEGER (-1..6),
  cqi-ReportPeriodic-r10         CQI-ReportPeriodic-r10      OPTIONAL, -- Need ON
  pmi-RI-Report-r9               ENUMERATED {setup}          OPTIONAL, -- Cond PMIRIPCell
  csi-SubframePatternConfig-r10  CHOICE {
    release                        NULL,
    setup                          SEQUENCE {
      csi-MeasSubframeSet1-r10       MeasSubframePattern-r10,
      csi-MeasSubframeSet2-r10       MeasSubframePattern-r10
    }
  }                                                          OPTIONAL -- Need ON
}
```

TABLE 4

Configuration of measurement subframe subset for supporting eIMTA

```
CQI-ReportConfig-v1250 ::=       SEQUENCE {
  csi-SubframePatternConfig-r12    CHOICE {
    release                          NULL,
    setup                            SEQUENCE {
      csi-MeasSubframeSets-r12         BIT STRING (SIZE (10))
    }
  }                                                          OPTIONAL, -- Need ON
  cqi-ReportBoth-v1250             CQI-ReportBoth-v1250      OPTIONAL, -- Need ON
  cqi-ReportAperiodic-v1250        CQI-ReportAperiodic-v1250 OPTIONAL, -- Need ON
  altCQI-Table-r12                 ENUMERATED {
                                     allSubframes, csi-SubframeSet1,
                                     csi-SubframeSet2, spare1}  OPTIONAL -- Need OP
}
```

An eICIC measurement subframe subset supported by LTE is configured by using csi-MeasSubframeSet1-r10 and csi-MeasSubframeSet2-r10. MeasSubframePattern-r10 which a corresponding field refers to is shown in Table 5.

TABLE 5

MeasSubframePattern

```
-- ASN1START
MeasSubframePattern-r10 ::= CHOICE {
  SubframePatternFDD-r10    BIT STRING (SIZE (40)),
  subframePatternTDD-r10    CHOICE {
    subframeConfig1-5-r10     BIT STRING (SIZE (20)),
    subframeConfig0-r10       BIT STRING (SIZE (70)),
    subframeConfig6-r10       BIT STRING (SIZE (60)),
    ...
  },
  ...
}
-- ASN1STOP
```

Referring to Table 5, a left most significant bit (MSB) in the field indicates subframe #0, and the field set to 1 indicates that a subframe is included in a measurement subframe subset. Unlike the eICIC measurement subframe subset which configures each subframe through each field, the eIMTA measurement subframe subset uses one field, in which 0 indicates a first subframe set and 1 indicates a second subframe set. Therefore, a subframe may not be included in two subframe sets in eICIC, while a subframe needs to be always included in one of two subframe sets in the case of the eIMTA subframe set.

In addition, there are a PC that indicates a power ratio between a PDSCH and a CSI-RS RE required for a terminal to generate channel state reporting and a codebook subset restriction for configuring which codebook is to be used. Pc and the codebook subset restriction are configured by a p-C-AndCBSRList field of Table 6 including two p-C-AndCBSR fields of Table 7 in a list form, and each field refers to a configuration for each subframe subset.

TABLE 6 p-C-AndCBSRList

```
CSI-Process-r11 ::= SEQUENCE {
  ...
  p-C-AndCBSRList-r11 SEQUENCE (SIZE (1..2)) OF P-C-AndCBSR-
  r11,
  ...
}
```

TABLE 7 p-C-AndCBSR

```
P-C-AndCBSR-r11 ::= SEQUENCE {
  p-C-r11                    INTEGER (-8..15),
  codebookSubsetRestriction-r11   BIT STRING
}
```

PC may be defined by Equation (1) below, and may specify a value between −8 and 15 dB.

$$P_C = \frac{PDSCH\ EPRE}{CSI\text{-}RS\ EPRE} \qquad \text{Equation 1}$$

A base station may variably adjust CSI-RS transmission power for various purposes, for example, to improve channel estimation accuracy, and a terminal may identify, through reported PC, how much transmission power to be used for data transmission is lower or higher than transmission power used for channel estimation. Accordingly, even though the base station changes CSI-RS transmission power, the terminal may accurately calculate a channel quality indicator (CQI) and may report the CQI to the base station.

In a cellular system, a base station should transmit a reference signal to a terminal in order to measure a downlink channel state. In an LTE-A system of the 3GPP, a terminal measures a state of a channel between a base station and the terminal by using a CRS or CSI-RS transmitted from the base station. The state of the channel is measured basically in consideration of a plurality of factors, which includes the amount of interference in a downlink. The amount of interference in the downlink includes an interference signal and thermal noise caused by an antenna belonging to a neighboring base station, and the amount of interference is important for the terminal to determine a condition of a downlink channel. For example, when a base station having one transmitting antenna transmits a signal to a terminal having one receiving antenna, the terminal needs to determine energy per symbol, which may be received via a downlink using the reference signal received from the base station, and the amount of interference to be received at the same time during a period in which the symbol is received and needs to determine a ratio of energy per symbol to the amount of interference (Es/Io). The determined Es/Io is converted into a data rate or an equivalent value, which is reported to the base station in the form of a channel quality indicator (CQI), and accordingly the base station may determine a data rate at which the base station performs transmission to the terminal in the downlink.

In an LTE-A system, a terminal feeds back information about a downlink channel state to a base station so that the base station may perform downlink scheduling by using the information. That is, the terminal measures a reference signal transmitted by the base station via a downlink and feeds back information extracted from the reference signal to the base station in a form defined in the LTE/LTE-A standards. There are three major types of information that the terminal feeds back in LTE/LTE-A.

RI: Number of spatial layers that a terminal may receive in a current channel state.

Precoder matrix indicator (PMI): Indicator of a precoding matrix preferred by the terminal in the current channel state.

CQI: Maximum data rate at which the terminal may perform reception in the current channel state. The CQI may be replaced with a signal-to-interference plus noise ratio (SINR) that may be utilized similar to the maximum data rate, a maximum error correction-coding rate, a modulation scheme, data efficiency per frequency, and the like.

The RI, PMI, and CQI are semantically associated. For example, a precoding matrix supported in an LTE system, an LTE-A system, and a similar system is defined differently by rank. Therefore, a PMI value when the RI has a value of 1 and a PMI value when the RI has a value of 2 are interpreted differently even though the values are the same. Also, when the terminal determines a CQI, the terminal assumes that a PMI value and a rank value that the terminal has reported to the base station are applied by the base station. That is, when the terminal reports RI_X, PMI_Y, and CQI_Z to the base station, if a rank is RI_X and an applied precoding matrix is PMI_Y, the terminal may perform reception at a data rate corresponding to CQI_Z. Thus, in calculating a CQI, the terminal assumes a transmission scheme to be performed by the base station, thereby obtaining optimized performance when transmission is performed according to the transmission scheme.

In an LTE system, an LTE-A system, and a similar system, periodic feedback of a terminal is configured to one of the following four reporting modes (interchangeable with feedback modes) depending on included information.

Reporting mode 1-0 (wideband CQI with no PMI): RI, broadband (wideband) CQI (wCQI)

Reporting mode 1-1 (wideband CQI with single PMI): RI, wCQI, PMI

Reporting mode 2-0 (subband CQI with no PMI): RI, wCQI, narrowband (subband) CQI (sCQI)

Reporting mode 2-1 (subband CQI with single PMI): RI, wCQI, sCQI, PMI

The feedback timing of information about each of the four feedback modes is determined by values of $N_{pd}$, $N_{OFFSET,CQI}$, $M_{RI}$, and $N_{OFFSET,RI}$ which are transmitted via a higher layer signal. In reporting mode 1-0, the feedback timing is determined with a wCQI transmission period of $N_{pd}$ and a subframe offset of $N_{OFFSET,CQI}$. Further, an RI has a transmission period of $N_{pd} \cdot M_{RI}$ and an offset of $N_{OFFSET,CQI}$, $N_{OFFSET,RI}$.

Figure 2:
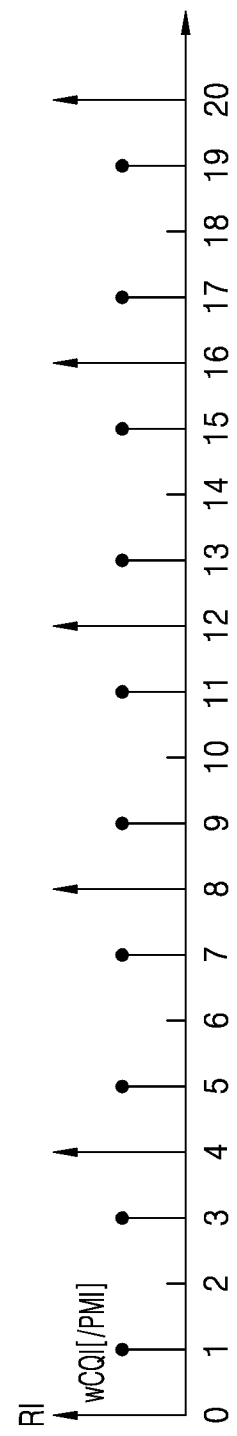
FIG. 2 is a diagram illustrating a feedback timing of a rank indicator (RI) and a wideband channel quality indicator (wCQI), when $N_{pd}=2$, $M_{RI}=2$, $N_{OFFSET,CQI}=1$, $N_{OFFSET,RI}=-1$.

FIG. 2 is a diagram illustrating a feedback timing of an RI and a wCQI when $N_{pd}=2$, $M_{RI}=2$, $N_{OFFSET,CQI}=1$, $N_{OFFSET,RI}=-1$.

Referring to FIG. 2, reporting mode 1-1 has the same feedback timing as mode 1-0 except that a wCQI and a PMI are transmitted together at a wCQI transmission timing.

In reporting mode 2-0, an sCQI has a feedback period of $N_{pd}$ and an offset of $N_{OFFSET,CQI}$. Further, a wCQI has a feedback period of $H \cdot N_{pd}$ and an offset of $N_{OFFSET,CQI}$, which is the same as the offset of the sCQI. Here, $H=J \cdot K+1$ where K is transmitted via a higher layer signal and is a value determined according to a system bandwidth. For example, J may be defined as 3 for a 10-MHz system. That is, the wCQI is transmitted to replace the sCQI every H sCQI transmissions. Also, an RI has a period of $M_{RI} \cdot H \cdot N_{pd}$ and an offset of $N_{OFFSET,CQI}+N_{OFFSET,RI}$.

Figure 3:
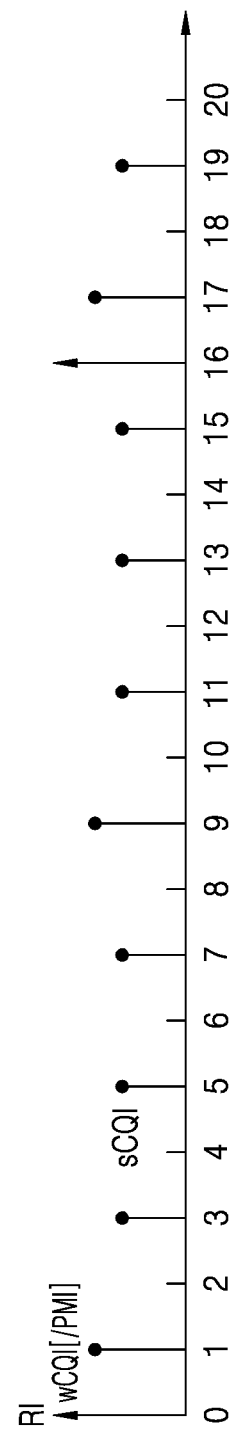
FIG. 3 is a diagram illustrating a feedback timing of an RI, a subband channel quality indicator (sCQI), and a wCQI, when $N_{pd}=2$, $M_{RI}=2$, J=3 (10 MHz), K=1, $N_{OFFSET,CQI}=1$, $N_{OFFSET,RI}=-1$.

FIG. 3 is a diagram illustrating a feedback timing of an RI, an sCQI, and a wCQI when $N_{pd}=2$, $M_{RI}=2$, $J=3$ (10 MHz), $K=1$, $N_{OFFSET,CQI}=1$, $N_{OFFSET,RI}=-1$.

Reporting mode 2-1 has the same feedback timing as mode 2-0 except that a wCQI and a PMI are transmitted together at a wCQI transmission timing.

The foregoing feedback timings are for four or fewer CSI-RS antenna ports, and, for a terminal allocated CSI-RSs for eight antennas ports, two pieces of PMI information need to be fed back unlike in the foregoing feedback timings. In more detail, for the eight CSI-RS antenna ports, reporting mode 1-1 is further divided into two submodes, wherein an RI is transmitted along with first PMI information in a first submode and a wCQI is transmitted along with second PMI information in a second submode. Here, a feedback period and an offset for the wCQI and the second PMI are defined as $N_{pd}$ and $N_{OFFSET,CQI}$, and a feedback period and an offset for the RI and the first PMI information are defined as $M_{RI} \cdot N_{pd}$ and $N_{OFFSET,CQI}+N_{OFFSET,RI}$. When a precoding matrix corresponding to the first PMI is W1 and a precoding matrix corresponding to the second PMI is W2, a terminal and a base station share information indicating that a precoding matrix preferred by the terminal is determined to be W1, W2.

Figure 4:
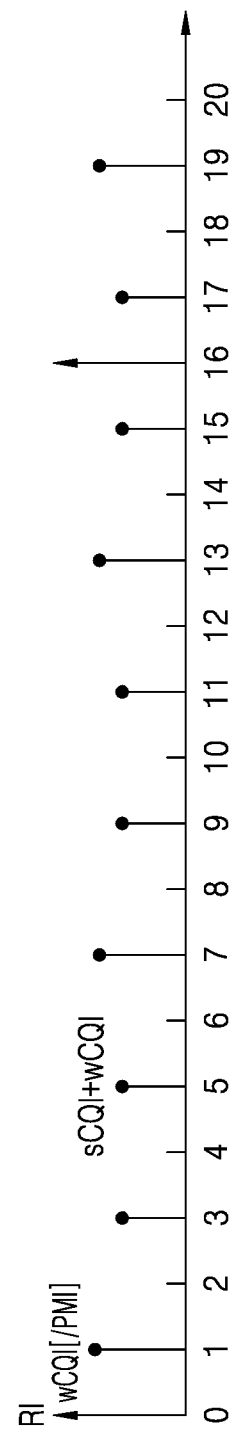
FIGS. 4 and 5 are diagrams illustrating a feedback timing when a precoding type indicator (PTI)=0 and PTI=1, respectively when $N_{pd}=2$, $M_{RI}=2$, J=3 (10 MHz), K=1, H'=3, $N_{OFFSET,CQI}=1$, $N_{OFFSET,RI}=-1$.
Figure 5:
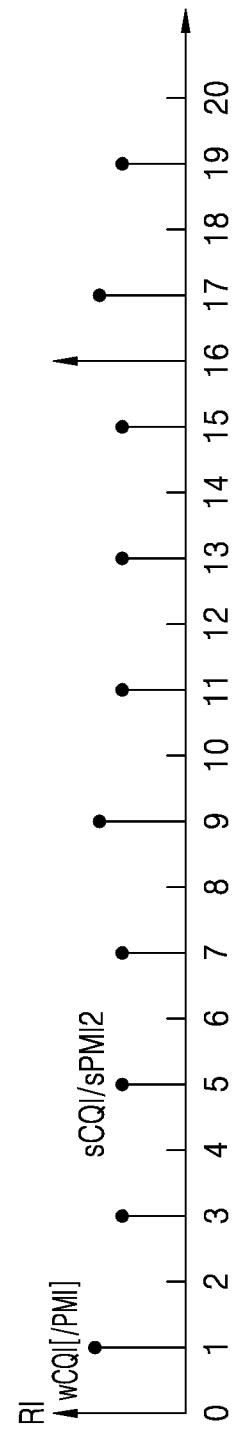

FIGS. 4 and 5 are diagrams illustrating a feedback timing when precoding type indicator (PTI)=0 and PTI=1, respectively when $N_{pd}=2$, $M_{RI}=2$, J=3 (10 MHz), K=1, $N_{OFFSET,CQI}=1$, $N_{OFFSET,RI}=-1$.

In reporting mode 2-1 for eight CSI-RS antenna ports, feedback of PTI information is added. A PTI is fed back along with an RI and has a feedback period of $M_{RI} \cdot H \cdot N_{pd}$ and an offset of $N_{OFFSET,CQI} + N_{OFFSET,RI}$. When the PTI is 0, all of a first PMI, a second PMI, and a wCQI are fed back, in which the wCQI and the second PMI are transmitted at the same timing with a period of $N_{pd}$ and an offset of $N_{OFFSET,CQI}$. Further, the first PMI has a period of $H \cdot N_{pd}$ and an offset of $N_{OFFSET,CQI}$. Here, H' is transmitted via a high-layer signal. When the PTI is 1, the PTI and the RI are transmitted together, the wCQI and the second PMI are transmitted together, and an sCQI is additionally fed back at a separate timing. In this case, the first PMI is not transmitted. A period and an offset of the PTI and the RI are the same as those in a PTI of 0, and the sCQI is defined to have a period of $N_{pd}$ and an offset of $N_{OFFSET,CQI}$. Also, the wCQI and the second PMI are fed back with a period of $H \cdot N_{pd}$ and an offset of $N_{OFFSET,CQI}$, in which H is defined the same as in the case of four CSI-RS antenna ports.

Figure 6:
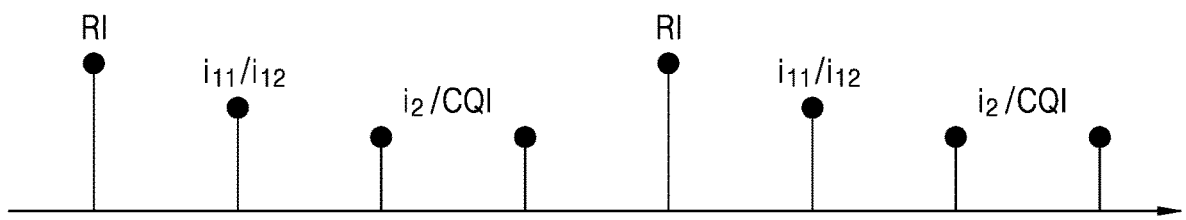
FIG. 6 is a diagram for describing periodic channel state reporting supported by terminals to which channel state information reference signals (CSI-RSs) of 12 or more ports are configured in an LTE system, an LTE-A system, or a similar system.

FIG. 6 is a diagram for describing periodic channel state reporting supported by terminals in which CSI-RSs of 12 or more ports are configured in an LTE system, an LTE-A system, or a similar system.

3GPP LTE Release 13 and Release 14 support a non-precoded (NP) CSI-RS to support 12 or more CSI-RS ports for two-dimensional (2D) array antennas. The NP CSI-RS supports 8, 12, 16 or more CSI-RS ports by using locations for existing CSI-RSs in one subframe. A corresponding field is configured to CSI-RS-ConfigNZP-EMIMO. By using this, a terminal may identify and receive locations of CSI-RS resources. In a beamformed (BF) CSI-RS, individual CSI-RS resources that may have different CSI-RS port numbers, subframes, and codebook subset restrictions are tied to be used as the BF CSI-RS by using csi-RS-ConfigNZPIdListExt-r13 and csi-IM-ConfigIdListExt-r13. In the NP CSI-RS, a new 2D codebook is necessary to support 2D antennas, and this may vary depending on antennas for dimensions, an oversampling factor, and a codebook configuration. Through analysis of PMI bits of the 2D codebook, bits for i2 (W2) reporting are equal to or less than 4 bits, and thus an existing channel state reporting method may be used. However, in the case of i11/i12, PMI bits increase with respect to N1, N2, O1, O2, and CodebookConfig supported as in Table 8.

TABLE 8

PMI overhead analysis of 2D codebook (a)

| (N1, N2) | (O1, O2) combinations |
|---|---|
| (8, 1) | (4, —)(8, —) |
| (2, 2) | (4, 4), (8, 8) |
| (2, 3) | {(8, 4), (8, 8)} |
| (3, 2) | {(8, 4), (4, 4)} |
| (2, 4) | {(8, 4), (8, 8)} |
| (4, 2) | {(8, 4), (4, 4)} |

(b)
Config = 1

| (N1, N2) | (O1, O2) | W11/W12 bits | (O1, O2) | W11/W12 bits |
|---|---|---|---|---|
| (8, 1) | (4, —) | 5 + 2 bits | (8, —) | 6 + 2 bits |
| (2, 2) | (4, 4) | 3 + 1 bits/3 bits | (8, 8) | 4 + 1 bits/4 bits |

TABLE 8-continued

PMI overhead analysis of 2D codebook

| (2, 3) | (8, 4) | 4 + 1 bits/4 bits | (8, 8) | 4 + 1 bits/5 bits |
| (3, 2) | (8, 4) | 5 + 1 bits/3 bits | (4, 4) | 4 + 1 bits/3 bits |
| (2, 4) | (8, 4) | 4 + 1 bits/4 bits | (8, 8) | 4 + 1 bits/5 bits |
| (4, 2) | (8, 4) | 5 + 1 bits/3 bits | (4, 4) | 4 + 1 bits/3 bits |

(c)
Config = 2, 3, 4

| (N1, N2) | (O1, O2) | W11/W12 bits | (O1, O2) | W11/W12 bits |
|---|---|---|---|---|
| (8, 1) | (4, —) | 4 + 2 bits | (8, —) | 5 + 2 bits |
| (2, 2) | (4, 4) | 2 + 1 bits/2 bits | (8, 8) | 3 + 1 bits/3 bits |
| (2, 3) | (8, 4) | 3 + 1 bits/3 bits | (8, 8) | 3 + 1 bits/4 bits |
| (3, 2) | (8, 4) | 4 + 1 bits/2 bits | (4, 4) | 3 + 1 bits/2 bits |
| (2, 4) | (8, 4) | 3 + 1 bits/3 bits | (8, 8) | 3 + 1 bits/4 bits |
| (4, 2) | (8, 4) | 4 + 1 bits/3 bits | (4, 4) | 3 + 1 bits/2 bits |

+k: additional bits for rank 3 and 4

Referring to Table 8, it may be identified that it is maximized when (N1, N2, O1, O2)=(2, 4, 8, 8) and Config is 1, and 10 bits should be transmitted. In physical uplink control channel (PUCCH) format 2 used for existing periodic channel state reporting, up to 13 bits of Reed-Muller code used for channel coding may be transmitted, whereas in an extended cyclic prefix (CP), HARQ ACK/NACK of 2 bits should be supported, and thus a payload size actually transmittable in a normal CP state is 11 bits. In order to support such a payload size, three independent CSI feedback timings of FIG. 6 are used in both a broadband CQI mode and a subband CQI mode.

An LTE system, an LTE-A system, and a similar system support aperiodic feedback, in addition to periodic feedback of a terminal. When a base station desires to obtain aperiodic feedback information of the predetermined terminal, the base station configures an aperiodic feedback indicator included in downlink control information (DCI) for uplink data scheduling of the terminal to execute predetermined aperiodic feedback, and executes uplink data scheduling of the terminal. When the terminal receives, at an nth subframe, an indicator that is configured to execute aperiodic feedback, the terminal executes uplink transmission by including aperiodic feedback information in data transmission at an (n+k)th subframe. Here, k that is a parameter defined in the 3GPP LTE Release 11 standard is 4 in frequency-division duplexing (FDD) and is defined as shown in Table 9 in time-division duplexing (TDD).

TABLE 9

K value for each subframe number n in TDD UL/DL configuration

| TDD UL/DL Configuration | subframe number n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | 7 | 4 | — | — | 6 | 7 | 4 |
| 1 | — | — | 6 | 4 | — | — | — | 6 | 4 | — |
| 2 | — | — | 4 | — | — | — | — | 4 | — | — |
| 3 | — | — | 4 | 4 | 4 | — | — | — | — | — |
| 4 | — | — | 4 | 4 | — | — | — | — | — | — |
| 5 | — | — | 4 | — | — | — | — | — | — | — |
| 6 | — | — | 7 | 7 | 5 | — | — | 7 | 7 | — |

When aperiodic feedback is configured, feedback information may include an RI, PMI, and CQI like periodic feedback, and the RI and the PMI may not be fed back according to a feedback configuration. The CQI may include both a wCQI and an sCQI, or may include only wCQI information.

An LTE system, an LTE-A system, or a similar system may provide a codebook subsampling function for periodic channel state reporting. In an LTE system, an LTE-A system, or a similar system, periodic feedback of a terminal may be transmitted to a base station through a PUCCH. Because the amount of information that may be transmitted through a PUCCH at one time is limited, and thus, various feedback objects, such as, an RI, a wCQI, an sCQI, a PMI1, a wPMI2, and an sPMI2, may be transmitted on the PUCCH through subsampling, or two or more pieces of feedback information may be jointly encoded and then transmitted through on the PUCCH. When the number of CSI-RS ports configured by a base station is 8, an RI and a PMI1 reported in submode 1 of PUCCH mode 1-1 may be jointly encoded as shown in Table 11. Referring to Table 10, an RI composed of 3 bits and a PMI1 composed of 4 bits may be jointly encoded to have a total of 5 bits. In submode 2 of PUCCH mode 1-1, as shown in Table 11, a PMI1 composed of 4 bits and a PMI2 composed of another 4 bits may be jointly encoded to form a total of 4 bits. Because submode 2 has a higher subsampling scale than submode 1 (4→3 in submode 1, and 8→4 in submode 2), more precoding indexes may not be reported. Alternatively, when the number of CSI-RS ports configured by a base station is 8, a PMI2 reported in PUCCH mode 2-1 may be subsampled as shown in Table 12. Referring to Table 12, the PMI2 is reported to have 4 bits when an RI is 1. However, when the associated RI is a value greater than or equal to 2, a differential CQI for a second codeword needs to be additionally reported, and thus it may be known that the PMI2 is subsampled and reported as 2 bits.

TABLE 10

Joint encoding of RI and i1 in submode 1 of PUCCH mode 1-1

| Value of joint encoding of RI and the first PMI $I_{RI/PMI1}$ | RI | Codebook index $i_1$ |
| --- | --- | --- |
| 0-7 | 1 | $2I_{RI/PMI1}$ |
| 8-15 | 2 | $2(I_{RI/PMI1} - 8)$ |
| 16-17 | 3 | $2(I_{RI/PMI1} - 16)$ |
| 18-19 | 4 | $2(I_{RI/PMI1} - 18)$ |
| 20-21 | 5 | $2(I_{RI/PMI1} - 20)$ |
| 22-23 | 6 | $2(I_{RI/PMI1} - 22)$ |
| 24-25 | 7 | $2(I_{RI/PMI1} - 24)$ |
| 26 | 8 | 0 |
| 27-31 | reserved | NA |

TABLE 11

Joint encoding of RI, i1, and i2 in submode 2 of PUCCH mode 1-1

| | Relationship between the first PMI value and codebook index $i_1$ | | Relationship between the second PMI value and codebook index $i_2$ | | |
| --- | --- | --- | --- | --- | --- |
| RI | Value of the first PMI $I_{PMI}$ | Codebook index $i_1$ | Value of the second PMI $I_{PMI2}$ | Codebook index $i_2$ | total #bits |
| 1 | 0-7 | $2I_{PMI1}$ | 0-1 | $2I_{PMI2}$ | 4 |
| 2 | 0-7 | $2I_{PMI1}$ | 0-1 | $I_{PMI2}$ | 4 |
| 3 | 0-1 | $2I_{PMI1}$ | 0-7 | $4\lfloor I_{PMI2}/4 \rfloor + I_{PMI3}$ | 4 |
| 4 | 0-1 | $2I_{PMI1}$ | 0-7 | $I_{PMI2}$ | 4 |
| 5 | 0-3 | $I_{PMI}$ | 0 | 0 | 2 |
| 6 | 0-3 | $I_{PMI1}$ | 0 | 0 | 2 |
| 7 | 0-3 | $I_{PMI1}$ | 0 | 0 | 2 |
| 8 | 0 | 0 | 0 | 0 | 0 |

TABLE 12

Codebook subsampling of PUCCH mode 2-1

| | | Relationship between the second PMI value and codebook index $i_2$ |
| --- | --- | --- |
| RI | Value of the second PMI $I_{PMI2}$ | Codebook index $i_2$ |
| 1 | 0-15 | $I_{PMI2}$ |
| 2 | 0-3 | $2I_{PMI2}$ |
| 3 | 0-3 | $8 \cdot \lfloor I_{PMI2}/2 \rfloor + I_{PMI2} \bmod 2) + 2$ |
| 4 | 0-3 | $2I_{PMI2}$ |
| 5 | 0 | 0 |
| 6 | 0 | 0 |
| 7 | 0 | 0 |
| 8 | 0 | 0 |

Figure 7:
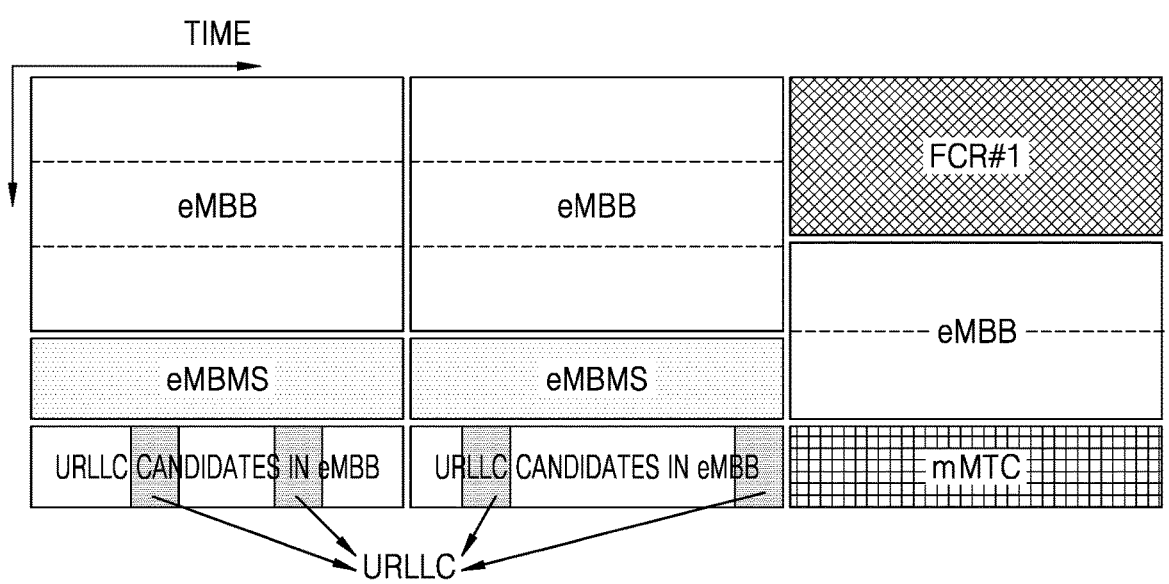
FIG. 7 is a diagram for describing a method of allocating, in radio resources, data of enhanced mobile broadband (eMBB), ultra-reliable and low-latency communications (URLLC), and massive machine type communications (mMTC) that are services considered in a 5th generation (5G) or new radio (NR) system.

FIG. 7 is a diagram for describing a method of allocating, in radio resources, data of eMBB, URLLC, and mMTC that are services considered in a 5G or NR system.

Referring to FIG. 7, when URLLC data is generated and needs to be transmitted while eMBB data and mMTC data are transmitted in a particular allocated frequency band, a portion pre-allocated for the eMBB data and the mMTC data may be emptied and the URLLC data may be transmitted. Since a short delay time is particularly important for URLLC, URLLC data may be allocated to a portion of resources to which eMBB data is allocated and may be transmitted, and the resources to which the eMBB data is allocated may be reported to a terminal in advance. To this end, the eMBB data may not be transmitted in frequency-time resources in which the eMBB data and the URLLC data overlap, and in this case, the transmission performance of the eMBB data may be reduced. That is, eMBB data transmission failure may occur due to URLLC data allocation. A length of a transmission time interval (TTI) used for URLLC data transmission may be shorter than a length of a TTI used for eMBB or mMTC data transmission.

Also, a resource (FCR #1) for technology to be applied later from among radio resources may be prepared.

Figure 8:
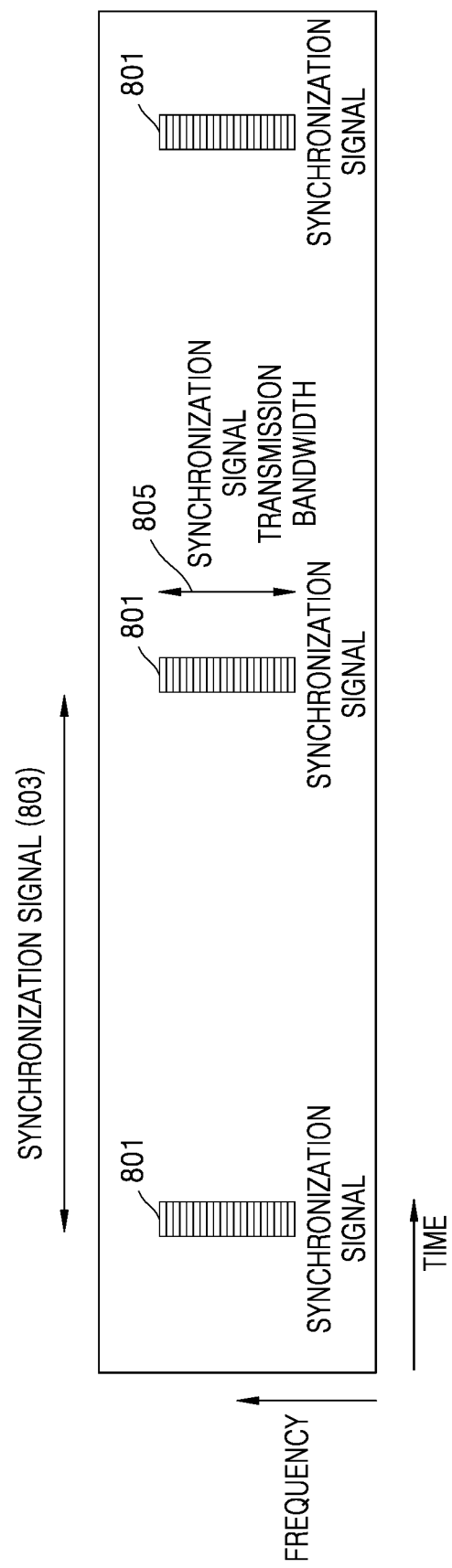
FIG. 8 is a diagram for describing a method of transmitting a synchronization signal considered in a 5G or NR system.

FIG. 8 is a diagram for describing a method of transmitting a synchronization signal considered in a 5G or NR system.

A synchronization signal is used to achieve synchronization with a cell in a network when a terminal accesses a wireless communication system. Specifically, a synchronization signal refers to a reference signal transmitted by a base station for time and frequency synchronization and for cell search at initial access of a terminal, and in an LTE system, an LTE-A system, or a similar system, a primary synchronization signal (PSS), a secondary synchronization signal (SSS), or the like may be transmitted for synchronization.

Referring to FIG. 8, in a 5G or NR system, a synchronization signal 801 may be transmitted in a synchronization signal period 803 along a time axis. Also, the synchronization signal 801 may be transmitted within a synchronization signal transmission bandwidth 805 along a frequency axis. The synchronization signal 801 may map a particular sequence to a subcarrier in the synchronization signal transmission bandwidth 805 in order to indicate a cell number (cell ID). In this case, a cell number may be mapped by one sequence or a combination of a plurality of sequences, and thus a terminal may detect the number of a cell which the terminal desires to access by detecting a sequence used for a synchronization signal.

The sequence used for the synchronization signal may be a sequence having a constant amplitude zero auto correlation (CAPAC) characteristic, such as a Zadoff-Chu sequence or a Golay sequence, or may be a pseudo-random noise sequence, such as an M-sequence or a Gold sequence. It is assumed that the above synchronization signal is used. However, the synchronization signal is merely an example and the present disclosure is not limited thereto, and a synchronization signal having any of various sequences may be used.

The synchronization signal 801 may be configured using one OFDM symbol or a plurality of OFDM symbols. When the synchronization signal 801 is configured using a plurality of OFDM symbols, sequences for a plurality of different synchronization signals may be mapped to respective OFDM symbols. For example, similarly to in LTE, a PSS may be generated using three Zadoff-Chu sequences, and an SSS may be generated using a Gold sequence. A PSS of one cell may have three different values according to a physical layer cell ID of the cell, and three cell IDs in one cell ID group correspond to different PSSs. Therefore, a terminal may detect a PSS of a cell to identify one cell ID group among three cell ID groups supported in an LTE system. The terminal may additionally detect an SSS among 168 cell IDs, reduced from 504 cell IDs, via the ID group identified through the PSS, so as to finally determine the cell ID of the cell.

Figure 9:
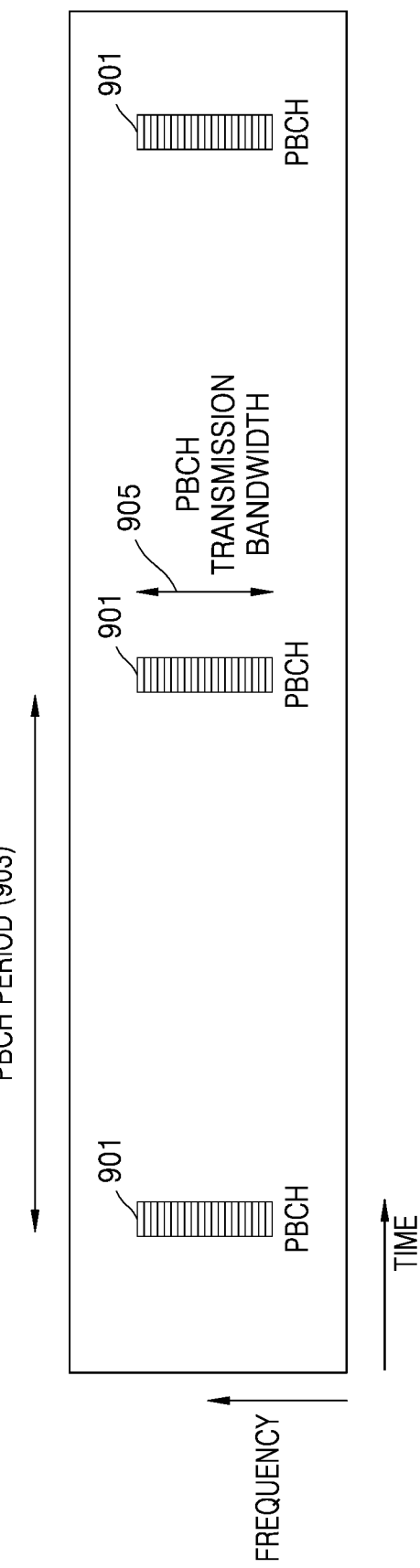
FIG. 9 is a diagram for describing a method of transmitting a physical broadcast channel (PBCH) considered in a 5G or NR system.

FIG. 9 is a diagram for describing a method of transmitting a physical broadcast channel (PBCH) considered in a 5G or NR system.

As described above, a terminal may synchronize with a cell in a network, may obtain a cell number (cell ID), and may obtain a cell frame timing. Next, the terminal should receive cell system information. The cell system information that is repeatedly broadcast by the network is information which the terminal needs to know in order to access the cell and generally operate properly in the cell. In an LTE system, system information is transmitted through two different transmission channels, a master information block (MIB) is transmitted by using a physical broadcast channel (PBCH), and a system information block (SIB) is transmitted by using a physical downlink shared channel (PDSCH). The system information included in the MIB includes a downlink transmission bandwidth, physical hybrid ARQ indicator channel (PHICH) configuration information, and a system frame number (SFN).

Referring to FIG. 9, in a 5G or NR system, a PBCH 901 may be transmitted in a PBCH period 903 along a time axis. Also, the PBCH 901 may be transmitted within a PBCH transmission bandwidth 905 along a frequency axis. In order to improve coverage, a base station may transmit the same signal in the PBCH period 903, and a terminal may receive and combine the same signal. Further, when the base station transmits the PBCH 901, a transmission scheme such as transmit diversity (TxD) using a plurality of antenna ports or precoder cycling based on one DMRS port may be applied and a diversity gain may be obtained without additional information about a transmission scheme used by a receiver. It is assumed that the above PBCH is used. However, the PBCH is merely an example and the present disclosure is not limited thereto, and a PBCH having any of various structures may be used.

In a 5G or NR system, the PBCH 901 may be configured using a plurality of OFDM symbols in resources in a time-frequency domain, or may be configured to be distributed among resources in a time-frequency domain, like in an LTE system. A terminal should receive and decode a PBCH in order to receive system information. In an LTE system, the terminal may perform channel estimation on the PBCH by using a CRS.

Figure 10:
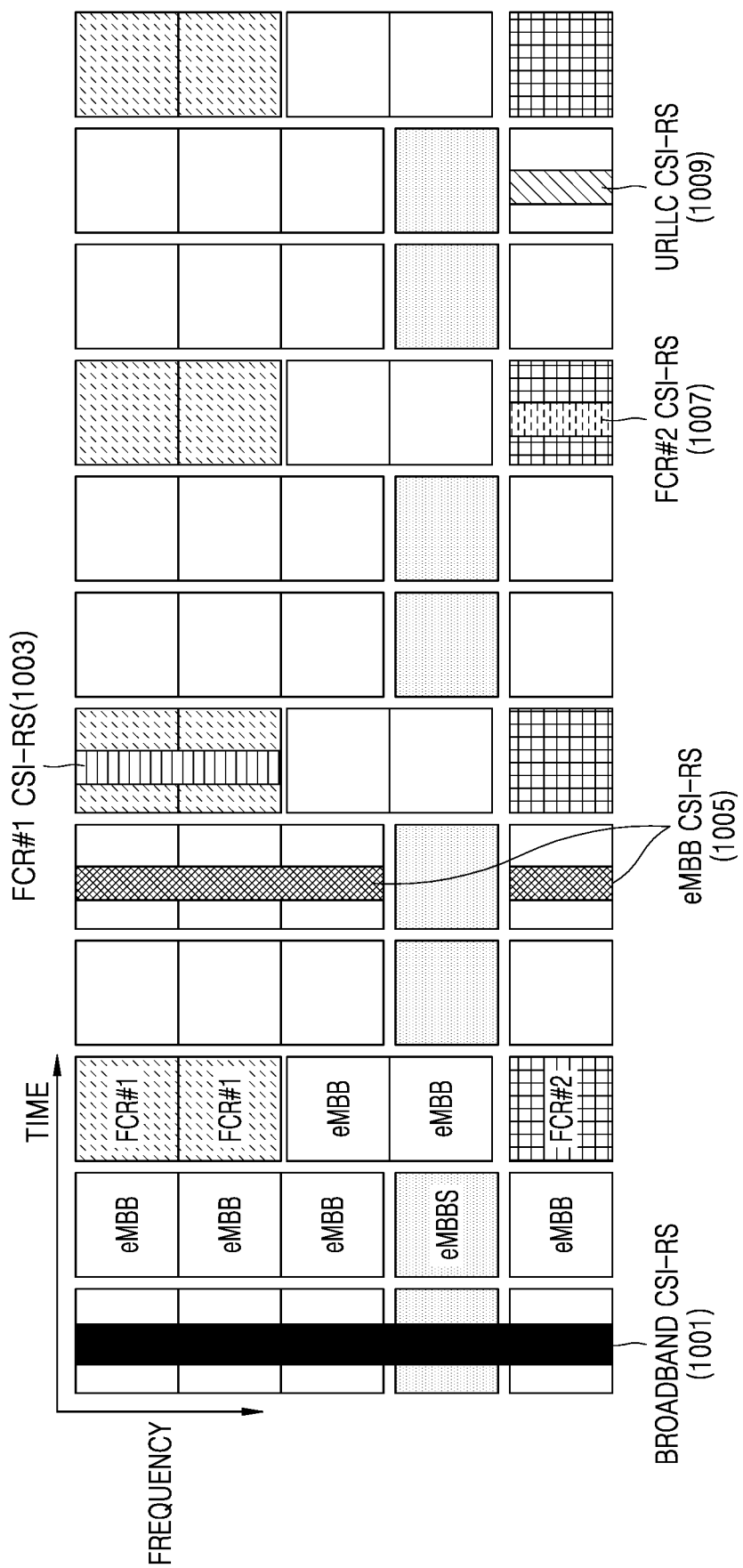
FIG. 10 is a diagram for describing a method of multiplexing services in a 5G or NR system.

FIG. 10 is a diagram for describing a method of multiplexing services in a 5G or NR system.

Referring to FIG. 10, a base station may allocate a full-band CSI-RS 1001 or multiple-band CSI-RSs 1003, 1005, 1007, and 1009 to a terminal in order to secure initial channel state information. The full-band CSI-RS 1001 or the multiple-band CSI-RSs 1003, 1005, 1007, and 1009 require a large amount of reference signal overhead, and thus may be disadvantageous for optimizing system performance. However, when there is no previously secured information, the full-band CSI-RS 1001 or the multiple-band CSI-RSs 1003, 1005, 1007, and 1009 may be necessary. After the full-band CSI-RS 1001 or the multiple-band CSI-RSs 1003, 1005, 1007, and 1009 are transmitted, individual services may be provided with different requirements for each service, and thus the accuracy of required channel state information and the necessity of updating required channel state information may also be changed. Therefore, after securing the initial channel state information, the base station may trigger a subband CSI-RS for each service in a corresponding band when necessary for each service.

Although FIG. 10 illustrates the transmission of a CSI-RS for each service at one time point, it is also possible that CSI-RSs for a plurality of services are transmitted as needed.

Figure 11:
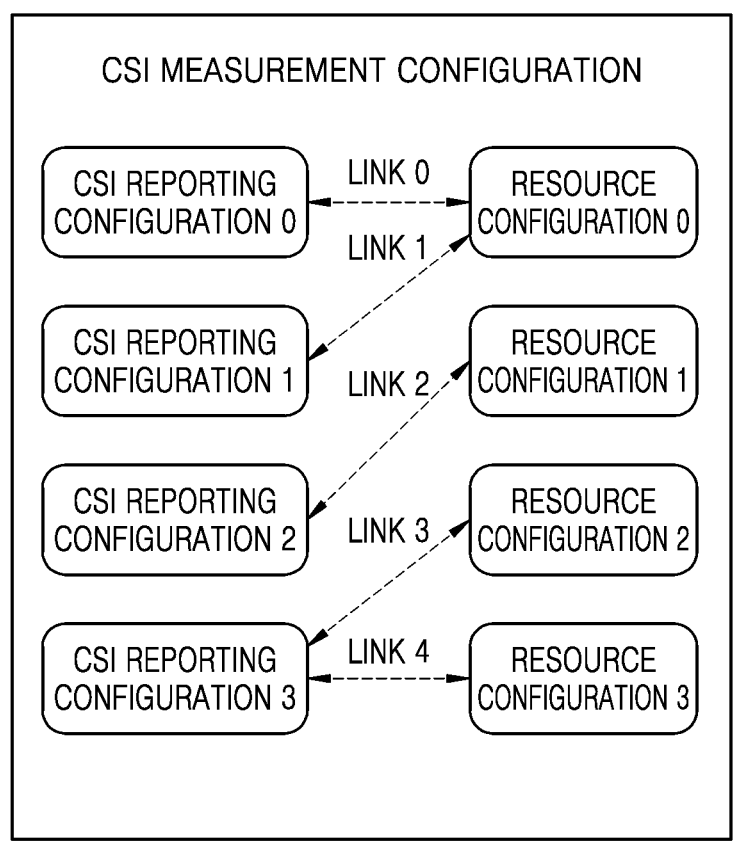
FIG. 11 is a diagram for describing a resource configuration, a channel measurement configuration, and a channel state reporting configuration which are necessary to support channel state reporting in a 5G, or NR system.

FIG. 11 is a diagram for describing a resource configuration, a channel measurement configuration, and a channel state reporting configuration which are necessary to support channel state reporting in a 5G or NR system.

A CSI-RS transmission and CSI reporting configuration of an LTE system and a CSI-RS transmission and CSI reporting configuration supported by a 5G or NR system may have different forms. A 5G or NR system may support a more flexible channel state reporting configuration than an LTE system through a resource configuration, a channel measurement configuration, and a channel state reporting configuration which are necessary to support channel state reporting.

FIG. 11 is a diagram illustrating a resource configuration, a channel measurement configuration, and a channel state reporting configuration which are necessary to support channel state reporting in a 5G or NR system. The resource configuration, the channel measurement configuration, and the channel state reporting configuration may include configuration information as follows.

Channel state reporting configuration (CSI reporting setting): Turning on/off of reporting parameters (e.g., an RI, a PMI, and a CQI) required for channel state reporting may be configured. Also, a channel state reporting type may be configured (e.g., configuration may be performed according to Type I (channel state reporting having a low resolution and an implicit reporting type) or Type II (channel state reporting having a high resolution, and a type of explicitly reporting an eigenvector, a covariance matrix, etc., by using linear combination-type channel state reporting)). Specifically, a channel state reporting configuration (whether to report an RI, a PMI, a CQI, a beam indicator (BI), a CSI-RS resource indicator (CRI), or the like (an individual configuration or a combined configuration)), a reporting method (periodic, aperiodic, and semi-persistent reporting, or aperiodic and semi-persistent reporting may be configured as one parameter), codebook configuration information, a PMI type (full-band or partial-band), a channel state reporting type (implicit/explicit or Type I/Type II), a channel quality reporting type (CQI/RSRP), and a resource configuration for channel state reporting may be supported.

Resource configuration (resource setting): Resource configuration corresponds to a configuration including configuration information about a reference signal required for channel state measurement. A CSI-RS resource for channel measurement and an interference measurement resource (CSI-IM) for interference measurement may be configured, and a plurality of resource configurations may exist for this purpose. In addition, a transmission type of a corresponding reference signal (periodic, aperiodic, or semi-persistent transmission), a transmission period and offset of the reference signal, and the like may be configured.

Channel measurement configuration: Channel measurement configuration corresponds to a configuration of mapping or connection between the channel state reporting configuration and the resource configuration. For example, when there are N channel state reporting configurations and M resource configurations, L links establishing mapping between these multiple state reporting configurations and the resource configurations may be included in the channel measurement configuration. Also, an association configuration between a reference signal configuration and a reporting time (e.g., when the reference signal is to be transmitted in n subframes or slots, the reporting time may be configured by using parameters, such as D0-0, D1-0, D2-1, D3-2 and D3-3, and the reporting time may be accordingly defined as n+D0-0) may also be configured.

In addition to periodic and aperiodic channel state reporting supported by LTE, a 5G or NR system supports semi-persistent reference signal transmission and channel state information transmission. In this case, the periodic and semi-persistent channel state information transmission of the 5G or NR system may not support subband reporting among the above reporting modes. A PUCCH used in the periodic and semi-persistent channel state reporting has a limited amount of reporting that may be transmitted. Therefore, in an LTE system, a terminal may select and transmit some subbands of a bandwidth part. However, because reporting via a selective subband carries very limited information, the usefulness of the information is not great. Thus, the lack of support for such inefficient reporting may reduce the complexity of a terminal and increasing the efficiency of the reporting. In addition, when subband reporting is not supported in a 5G or NR system, no PMI may be reported or only one PMI corresponding to a broadband (wideband) or a partial band may be transmitted in periodic channel state information reporting.

Aperiodic channel state information reporting of a 5G or NR system may support the following reporting modes.
  Reporting mode 1-0 (wideband CQI with no PMI): RI, broadband (wideband) CQI (wCQI)
  Reporting mode 1-1 (wideband CQI with single PMI): RI, wCQI, PMI
  Reporting mode 1-2 (wideband CQI with multiple PMI): RI, broadband (wideband) CQI (wCQI), multiple broadband and narrowband PMIs
  Reporting mode 2-0 (subband CQI with no PMI): RI, wCQI, (subband) CQI (sCQI) of terminal-selected band
  Reporting mode 2-1 (subband CQI with single PMI): RI, wCQI, sCQI of terminal-selected band, PMI
  Reporting mode 2-2 (subband CQI with multiple PMIs): RI, wCQI, sCQI of terminal-selected band, multiple broadband and narrowband PMIs
  Reporting mode 3-0 (subband CQI with no PMI): RI, wCQI, narrowband (subband) CQI (sCQI) of full band
  Reporting mode 3-1 (subband CQI with single PMIs): RI, wCQI, narrowband (subband) CQI (sCQI) of full band, PMI
  Reporting mode 3-2 (subband CQI with multiple PMIs): RI, wCQI, narrowband (subband) CQI (sCQI) of full band, multiple broadband and narrowband PMIs Similar to periodic channel state reporting, reporting modes 2-0 and 2-2 in aperiodic channel state information reporting are types in which one of subbands in a bandwidth part for a terminal is selected for reporting, and may not be supported in a 5G or NR system due to the low efficiency of the reporting. Also, in an LTE system, a channel state reporting mode may be determined by using a CQI configuration and a PMI/RI reporting configuration in periodic channel state reporting while a channel state reporting mode may be directly configured in aperiodic channel state reporting. In a 5G or NR system, a PMI/RI reporting configuration and a CQI reporting configuration which are necessary for the channel state reporting configuration may be provided.

A 5G or NR system supports two types of channel state reporting having a low spatial resolution and a high spatial resolution. Tables 13 and 14 show two types of channel state reporting, and Tables 15 and 16 show a reporting overhead required for each reporting type.

TABLE 13

Type I channel state reporting
Type I SP: Overview

For 2 ports, NR supports the following Type I codebook $W \in \left\{ \frac{1}{\sqrt{2}} \begin{bmatrix} 1 \\ e^{j\frac{\pi n}{2}} \end{bmatrix}, n = 0, 1, 2, 3 \right\}$ for rank-1 and $\left\{ \frac{1}{2} \begin{bmatrix} 1 & 1 \\ j^n & -j^n \end{bmatrix}, n = 0, 1 \right\}$ for rank-2

For ≥4 ports, NR supports the following Type I CSI for rank 1 to 8
The PMI codebook assumes $W = W_1 W_2$ precoder structure, where $W_1 = \begin{bmatrix} B & 0 \\ 0 & B \end{bmatrix}$.

Figure 26A:
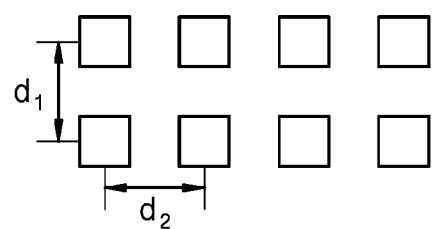
FIG. 26A illustrates a 2D antenna port layout of Table 13 and FIG. 26B illustrates a 1D antenna port layout of Table 13 according to an embodiment.
Figure 26B:
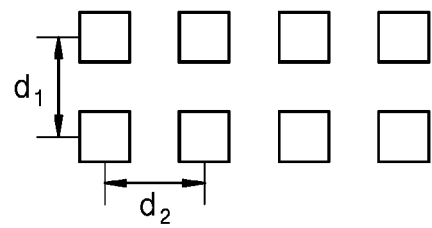

B is composed to L oversampled 2D DFT beams
For rank 1 and 2, the value of L is configurable: L ∈ {1,4}
$W_2$ performs beam selection (only for L = 4) and QPSK co-phasing between two pdarizations
The following 1D/2D antenna port layouts ($N_1$, $N_2$) and oversampling factors ($O_1$, $O_2$) (cf. Rel.13/14 LTE Class A codebooks) are supported
For L = 4, the following beam group (B) pattern is supported:
2D antenna port layout ($N_2$ > 1): See FIG. 26A
1D antenna port layout ($N_2$ = 1): See FIG. 26B

TABLE 14

Type II channel state reporting

Type II SP: Overview

> NR supports Type II Cat 1 CSI for rank 1 and 2
  PMI is used for Spatial Channel Information feedback
  The PMI codebook assumes the following precoder structure:

For rank 1: $W = \begin{bmatrix} \tilde{w}_{0,0} \\ \tilde{w}_{1,0} \end{bmatrix} = W_1 W_2$, W is normalized to 1

TABLE 14-continued

Type II channel state reporting

Type II SP: Overview

For rank 2: $W = \begin{bmatrix} \tilde{w}_{0,0} & \tilde{w}_{0,1} \\ \tilde{w}_{1,0} & \tilde{w}_{1,1} \end{bmatrix} = W_1 W_2$, columns of $W$ are normalized to $\frac{1}{\sqrt{2}}$ $\tilde{w}_{r,l} = \sum_{i=0}^{L-1} b_{k_1^{(i)} k_2^{(i)}} \cdot p_{r,l,i}^{(WB)} \cdot p_{r,l,i}^{(SB)} \cdot c_{r,l,i}$ (weighted combination of L beams)
The value of L is configurable: L ∈ {2,3,4}
$b_{k_1,k_2}$ is an oversampled 2D DFT beam
r = 0,1 (polarization), l = 0,1 (layer)

TABLE 15

Reporting overhead for Type I channel state reporting

| Number of CSI-RS ports | $(N_1, N_2)$ | $(O_1, O_2)$ | i1 Payload (L = 1) | i1 Payload (L = 4) | i2 payload |
|---|---|---|---|---|---|
| 4 | (2, 1) | (4, —) | 3 bits | 2 bits | For rank1, |
| 8 | (2, 2) | (4, 4) | 6 bits | 4 bits | 2 bits for L = 1, |
|  | (4, 1) | (4, —) | 4 bits | 3 bits | 4 bits for L = 4 |
| 12 | (3, 2) | (4, 4) | 7 bits | 5 bits | For rank2, |
|  | (6, 1) | (4, —) | 4 bits | 3 bits | Additional 2 bits |
| 16 | (4, 2) | (4, 4) | 7 bits | 5 bits | for i1, |
|  | (8, 1) | (4, —) | 5 bits | 4 bits | 1 bits for L = 1, |
| 24 | (6, 2), (4, 3) | (4, 4) | 8 bits | 6 bits | 3 bits for L = 4 |
|  | (12, 1) | (4, —) | 6 bits | 5 bits |  |
| 32 | (8, 2), (4, 4) | (4, 4) | 8 bits | 6 bits |  |
|  | (16, 1) | (4, —) | 6 bits | 5 bits |  |

TABLE 16

Reporting overhead for Type II channel state reporting
Type II SP: Example payload calculation for WB + SB amplitude
$(N_1, N_2) = (4, 4)$, Z = 3 (8-PSK phase), for K leading coefficients

| L (*) | Rotation: $\lceil \log_2(O_1 O_2) \rceil$ | L-beam selection (**) | Strongest coefficient (1 out of 2L): $\lceil \log_2 2L \rceil$ per layer | WB amp: 3 × (2L − 1) per layer | Total WB payload | SB amp (1 SB): 1 × (K − 1) per layer | SB phase (1 SB): Z × (K − 1) + 2 × (2L − K) per layer | Total payload (WB + 10 SBs) |
|---|---|---|---|---|---|---|---|---|
| \multicolumn{9}{c}{Rank 1 payload (bits)} |
| 2 | 4 | [7 or 8] | 2 | 9 | 22 | 3 | 9 | 142 |
| 3 | 4 | [10 or 12] | 3 | 15 | 32 | 3 | 13 | 192 |
| 4 | 4 | [11 or 16] | 3 | 21 | 39 | 5 | 19 | 279 |
| \multicolumn{9}{c}{Rank 2 payload (bits)} |
| 2 | 4 | [7 or 8] | 4 | 18 | 33 | 6 | 18 | 273 |
| 3 | 4 | [10 or 12] | 6 | 30 | 50 | 6 | 26 | 370 |
| 4 | 4 | [11 or 16] | 6 | 42 | 63 | 10 | 38 | 543 |

(*)Note:
*K = 4, 4, and 6 for L = 2, 3, and 4, respectively
*In this example (for illustrative purposes), it is assumed that all $p_{r,l,i}^{(WB)} > 0$. The PMI payload is reduced when $p_{r,l,i}^{(WB)} = 0$. Details FFS.
(**)Note:

It is *FFS* if beam selection is signaled jointly using $\left\lceil \log_2 \binom{N_1 N_2}{L} \right\rceil$ bits vs. independently using $\log_2(N_1 N_2)$ bits per beam; only one approach will be specified.

This example uses $\left\lceil \log_2 \binom{N_1 N_2}{L} \right\rceil$ bits to calculate total *WB* payload and total payload.

TABLE 14-continued

Type II channel state reporting

Type II SP: Overview $p_{r,l,i}^{(WB)}$ wideband (WB) beam amplitude scaling factor for beam i and on polarization r and layer l
$p_{r,l,i}^{(SB)}$ subband (SB) beam amplitude scaling factor for beam i and on polarization r and layer l
$c_{r,l,i}$ beam combining coefficient (phase) for beam i and on polarization r and layer l
 Configurable between QPSK (2 bits) and 8PSK (3 bits)
Configurable amplitude scaling mode: between WB + SB (with unequal bit allocation) and WB-only Type I channel state reporting may report a channel state to a base station via an RI, a PMI, a CQI, and a CSI-RS resource indicator (CRI) based on a codebook, as in existing LTE. In contrast, Type II reporting may provide a higher level of resolution via a greater PMI reporting overhead for implicit CSI similar to Type I reporting, and the PMI reporting may be performed by a linear combination of a precoder, a beam, a co-phase, etc. which are used for Type I reporting. Also, CSI may be reported in an explicit CSI form different from an existing form to report a direct channel state, and a representative example may be a method of reporting a covariance matrix of a channel. It is also possible to use a combination of implicit and explicit CSI forms. For example, a covariance matrix of a channel may be reported via a PMI, and a CQI or an RI may also be reported.

As mentioned above, Type II reporting requires a high reporting overhead. Therefore, Type II reporting may not be suitable for periodic channel state reporting that does not have a large number of bits for reporting. However, because aperiodic channel state reporting is supported through a physical uplink shared channel (PUSCH) that may support a great overhead, Type II reporting requiring a high reporting overhead may be supported only in aperiodic channel state reporting.

In addition, Type II reporting may be supported in semi-persistent channel state reporting. In a 5G or NR system, semi-persistent channel state reporting supports dynamic activation and deactivation as compared to periodic channel state reporting, thus requiring relatively high terminal complexity.

In channel state reporting of an LTE system, an LTE-A system, or a similar system, as shown in Table 1, a base station transmits, on the basis of a CSI process, a reference signal and report-related configuration to a terminal via a higher layer signal. In periodic channel state reporting, the terminal performs reporting by using pre-set resources at a pre-set reporting time, and in aperiodic channel state reporting, the terminal reports pre-set configuration information through a trigger in DCI transmitted from the base station through a downlink control signal.

Referring to FIG. 11, in a 5G or NR system, information about a channel state reporting configuration, a resource configuration, and a link for connecting the channel state reporting configuration and the resource configuration may be included in a channel measurement configuration. A method in which a base station triggers aperiodic channel state reporting to a terminal based on such configurations is as follows.

Aperiodic channel state reporting trigger method 1: Triggering based on a link in a measurement configuration; and Aperiodic channel state reporting trigger method 2: Triggering based on a channel state reporting configuration in a measurement configuration.

The aperiodic channel state reporting trigger method 1 is a method of performing triggering based on a link in a measurement configuration, and the aperiodic channel state reporting trigger method 2 is a method of performing triggering based on a channel state reporting configuration in a measurement configuration, which will be described with reference to FIGS. 12 through 15.

Figure 12:
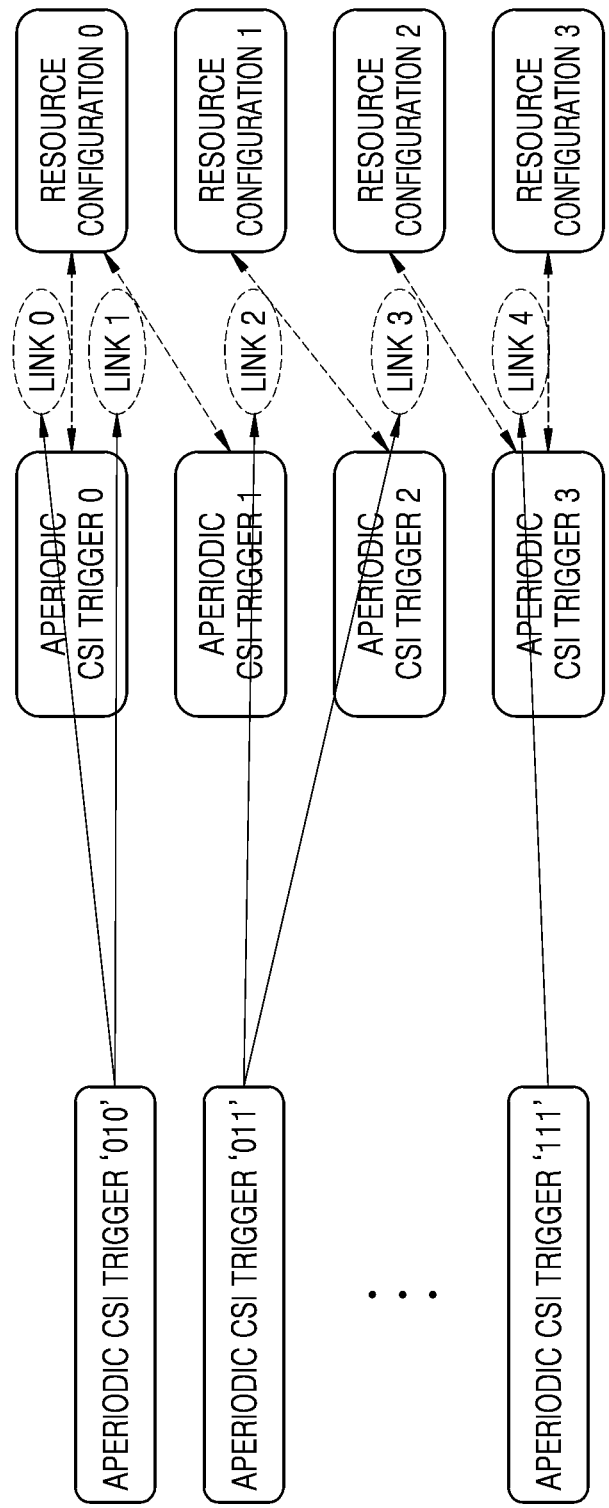
FIG. 12 is a diagram for describing a method of triggering a link in a trigger measurement configuration according to an aperiodic channel state reporting trigger method 1 in a 5G or NR system.

FIG. 12 is a diagram for describing a method of triggering a link in a trigger measurement configuration according to the aperiodic channel state reporting trigger method 1 in a 5G or NR system.

In FIG. 12, a base station may configure a link triggered for each trigger field via RRC in advance for aperiodic channel state reporting. The base station may directly configure a link ID in a trigger configuration in order to configure the triggered link.

Figure 13:
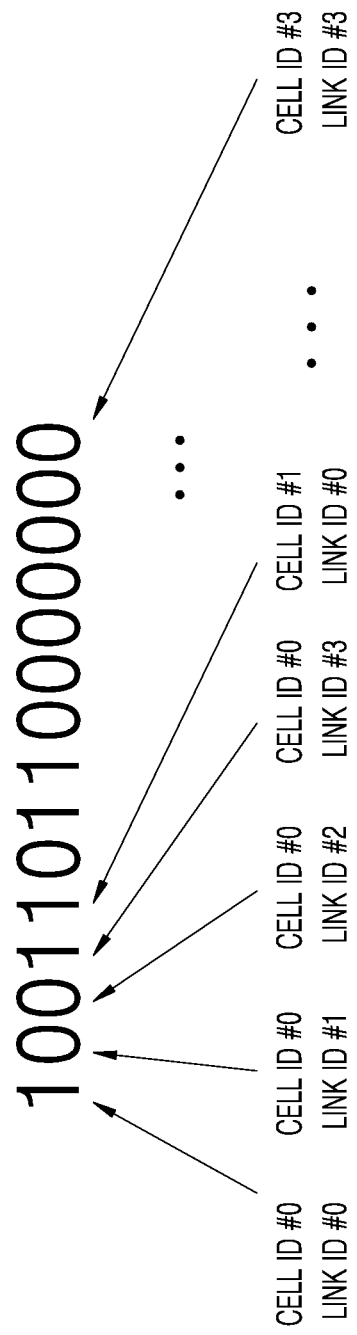
FIG. 13 is a diagram for describing an indication order of a bitmap for the aperiodic channel state reporting trigger method 1 in a 5G or NR system.

FIG. 13 is a diagram for describing an indication order of a bitmap for the aperiodic channel state reporting trigger method 1 in a 5G or NR system.

Referring to FIG. 13, a base station may configure a link by using a bitmap of links of all cells configured for a terminal. In this case, an indication order of the bitmap may be arranged in an ascending or descending order based on cell IDs and link IDs. For example, the indication order may be first arranged based on cell IDs, and then may be arranged in an ascending order from a most significant bit (MSB) to a least significant bit (LSB) based on link IDs within the same cell IDs. Although the cell IDs are preferentially arranged in FIG. 13, the link IDs may be arranged first, or may be arranged in a descending order.

In order for a base station to trigger channel state reporting based on links, the base station may cause a terminal to report an aperiodic channel state to the base station via DCI by using trigger fields shown in Tables 17, 18, and 19.

TABLE 17

Example 1 of aperiodic channel state reporting indication field based on link

| Value of CSI request field | Description |
| --- | --- |
| '000' | No aperiodic CSI report is triggered |
| '001' | Aperiodic CSI report is triggered for a set of link(s) configured by higher layers for serving cell |
| '010' | Aperiodic CSI report is triggered for a $1^{st}$ set of link(s) configured by higher layers |
| ... | ... |

TABLE 18

Example 2 of aperiodic channel state reporting indication field based on link

| Value of CSI request field | Description |
| --- | --- |
| '000' | Aperiodic CSI report is triggered for a set of link(s) configured by higher layers for serving cell |
| '001' | Aperiodic CSI report is triggered for a $1^{st}$ set of link(s) configured by higher layers |
| '010' | Aperiodic CSI report is triggered for a $2^{nd}$ set of link(s) configured by higher layers |
| ... | ... |

TABLE 19

Example 3 of aperiodic channel state reporting indication field based on link

| Value of CSI request field | Description |
| --- | --- |
| '000' | Aperiodic CSI report is triggered for a $1^{st}$ set of link(s) configured by higher layers |
| '001' | Aperiodic CSI report is triggered for a $2^{nd}$ set of link(s) configured by higher layers |
| '010' | Aperiodic CSI report is triggered for a $3^{rd}$ set of link(s) configured by higher layers |
| ... | ... |

Referring to Table 17, a base station may perform triggering by using indication fields, so that aperiodic channel state reporting is not triggered or so that all links of a corresponding cell are triggered, and from the bit '010' subsequent to '001', links triggered for channel state reporting via a pre-RRC configuration may be triggered as described above with reference to the aperiodic channel state reporting trigger method 1. Also, trigger fields used in Table 18 exclude a case involving no triggering therefrom, and in this case, there may be an option involving no triggering of channel state reporting in a pre-configuration of a trigger field for which '001' or the like may be configured. According to Table 19, flexibility may be provided in a configuration of the base station, by increasing the degree of freedom except for an aperiodic channel state reporting configuration that corresponds to reporting all links of one cell. Even in this case, like in Table 18, there may be an option involving no triggering of channel state reporting, in a pre-configuration of a trigger field for which '000' or the like may be configured.

Figure 14:
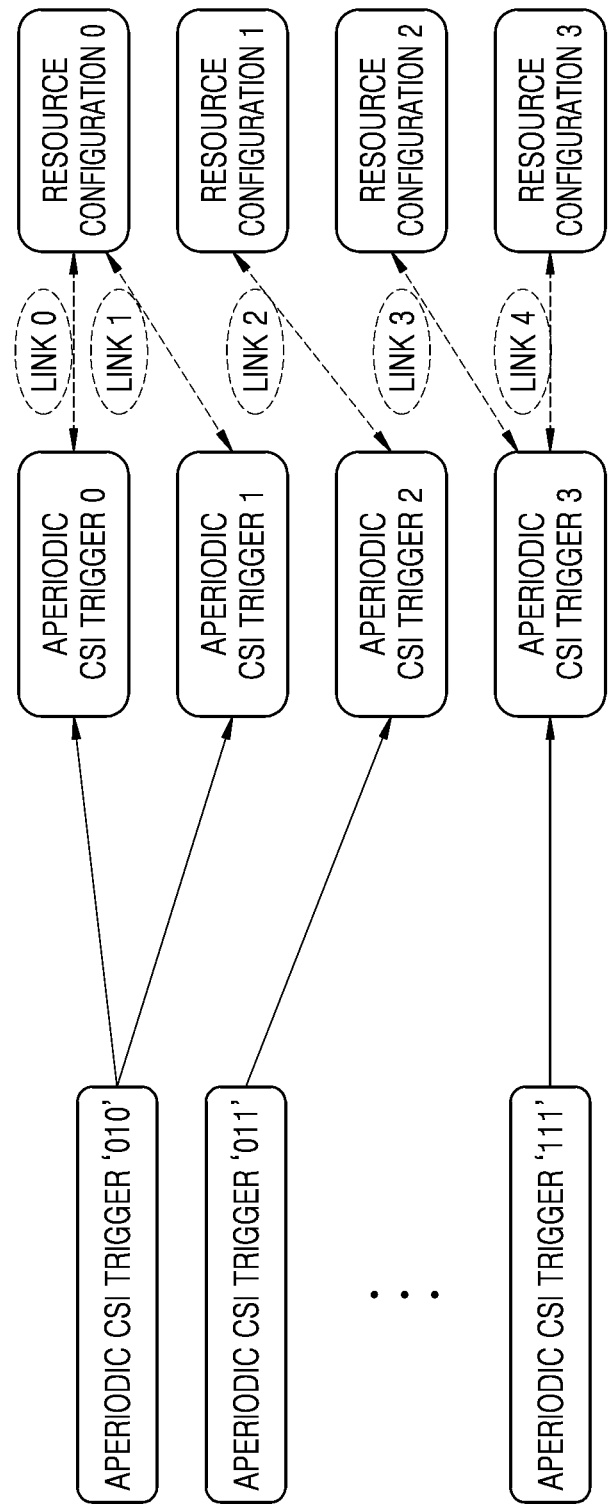
FIG. 14 is a diagram for describing a method of triggering a channel state reporting configuration in a trigger measurement configuration according to an aperiodic channel state reporting trigger method 2 in a 5G or NR system.

FIG. 14 is a diagram for describing a method of triggering a channel state reporting configuration in a trigger measurement configuration according to the aperiodic channel state reporting trigger method 2 in a 5G or NR system.

Referring to FIG. 14, the aperiodic channel state reporting trigger method 2 may perform triggering based on a channel state reporting configuration in a measurement configuration. A base station may configure a channel state reporting configuration triggered for each trigger field via RRC in advance for aperiodic channel state reporting. The base station may directly configure a channel state reporting configuration ID in a trigger configuration in order to configure the triggered channel state reporting configuration.

Figure 15:
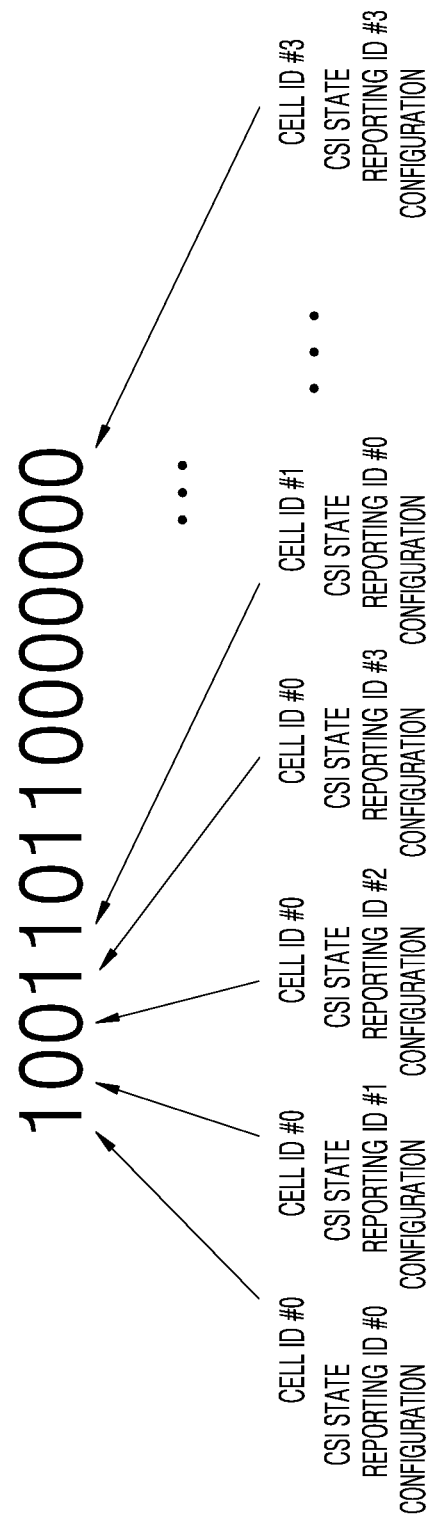
FIG. 15 is a diagram for describing an indication order of a bitmap for the aperiodic channel state reporting trigger method 2 in a 5G or NR system.

FIG. 15 is a diagram for describing an indication order of a bitmap for the aperiodic channel state reporting trigger method 2 in a 5G or NR system.

Referring to FIG. 15, a base station may configure a channel state reporting configuration by using a bitmap of channel state reporting configurations of all cells configured for a terminal. In this case, an indication order of the bitmap may be arranged in an ascending or descending order based on cell IDs and channel state reporting configuration IDs. For example, the indication order may first be arranged based on cell IDs, and then may be arranged in an ascending order from an MSB to an LSB based on channel state reporting configuration IDs within the same cell IDs. Although the cell IDs are preferentially arranged in FIG. 15, the channel state reporting configuration IDs may be arranged first, or may be arranged in a descending order.

In order for a base station to trigger channel state reporting based on links, the base station may cause a terminal to report an aperiodic channel state to the base station via DCI by using trigger fields shown in Tables 20, 21, and 22.

TABLE 20

Example 1 of aperiodic channel state reporting
indication field based on CSI channel state reporting configuration

| Value of CSI request field | Description |
|---|---|
| '000' | No aperiodic CSI report is triggered |
| '001' | Aperiodic CSI report is triggered for a set of CSI reporting setting(s) configured by higher layers for serving cell |
| '010' | Aperiodic CSI report is triggered for a $1^{st}$ set of CSI reporting setting(s) configured by higher layers |
| ... | ... |

TABLE 21

Example 2 of aperiodic channel state reporting
indication field based on CSI channel state reporting configuration

| Value of CSI request field | Description |
|---|---|
| '000' | Aperiodic CSI report is triggered for a set of CSI reporting setting(s) configured by higher layers for serving cell |
| '001' | Aperiodic CSI report is triggered for a $1^{st}$ set of CSI reporting setting(s) configured by higher layers |
| '010' | Aperiodic CSI report is triggered for a $2^{nd}$ set of CSI reporting setting(s) configured by higher layers |
| ... | ... |

TABLE 22

Example 3 of aperiodic channel state reporting indication
field based on CSI channel state reporting configuration

| Value of CSI request field | Description |
|---|---|
| '000' | Aperiodic CSI report is triggered for a $1^{st}$ set of CSI reporting setting(s) configured by higher layers |
| '001' | Aperiodic CSI report is triggered for a $2^{nd}$ set of CSI reporting setting(s) configured by higher layers |
| '010' | Aperiodic CSI report is triggered for a $3^{rd}$ set of CSI reporting setting(s) configured by higher layers |
| ... | ... |

Referring to Table 20, a base station may perform triggering by using indication fields, so that aperiodic channel state reporting is not triggered or so that all links of a corresponding cell are triggered, and from the bit '010' subsequent to '001', links triggered for channel state reporting via a pre-RRC configuration may be triggered as described above with reference to the aperiodic channel state reporting trigger method 2. Also, trigger fields used in Table 21 exclude a case involving no triggering therefrom, and in this case, there may be an option involving no triggering of channel state reporting in a pre-configuration of a trigger field for which '001' or the like may be configured. According to Table 22, flexibility may be provided in a configuration of the base station, by increasing the degree of freedom except for an aperiodic channel state reporting configuration that corresponds to reporting all channel state reporting configurations of one cell. Even in this case, like in Table 21, there may be an option involving no triggering of channel state reporting, in a pre-configuration of a trigger field for which '000' or the like may be configured.

Figure 16:
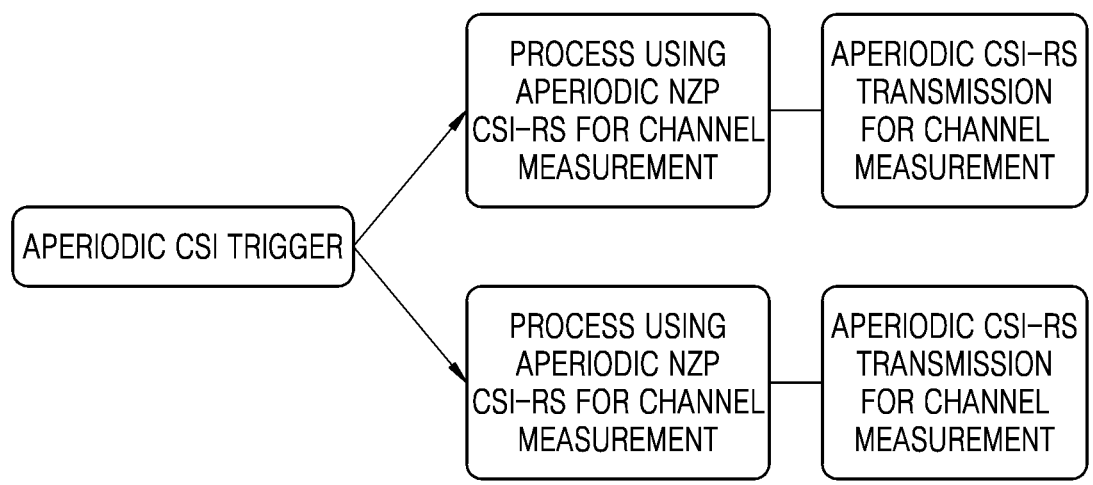
FIG. 16 is a diagram for describing a method of indirectly indicating an aperiodic CSI-RS by using an aperiodic channel state reporting indication field in a 5G or NR system.

FIG. 16 is a diagram for describing a method of indirectly indicating an aperiodic CSI-RS by using an aperiodic channel state reporting indication field in a 5G or NR system.

It is possible to indirectly indicate aperiodic CSI-RS for channel measurement and interference measurement by using an indication field. In FIG. 16, a base station triggers channel state reporting by using a link. In this case, when a resource supported for channel measurement in a resource configuration connected to the link is a periodic CSI-RS, aperiodic channel state reporting may be performed based on a channel measured at an existing periodic CSI-RS resource. Also, when a resource supported for channel measurement in the resource configuration connected to the link is an aperiodic CSI-RS, corresponding aperiodic channel state reporting may be performed based on a channel measured at an aperiodically configured CSI-RS resource. In this case, an aperiodic CSI-RS and aperiodic channel state reporting trigger may always be transmitted in the same slot or subframe. Also, as described above, triggering may be performed through a channel state reporting configuration instead of a link.

A resource for interference measurement and a desired signal may be configured for a terminal via a resource configuration of FIG. 11, in order to support channel state reporting. RRC parameters of Table 23 may be considered for a resource configuration.

TABLE 23

Resource configuration field

| Parameter name | Description | Value range |
| --- | --- | --- |
| CSI-RS-ResourceConfig | CSI-RS resource configuration | |
| CSI-RS-ResourceConfigId | CSI-RS resource configuration ID | 0 . . . CSI-RS-ResourceMax - 1 |
| ResourceConfigType | Time domain behavior of resource configuration | aperiodic semi-persistent, or periodic |
| CSI-RS-timeConfig | Contains periodicity and slot offset for periodic/semi-persistent CSI-RS | |
| NrofPorts | Number of ports | 1, 2, 4, 8, 12, 16, [24], 32 |
| CSI-RS-ResourceMapping | Include parameters to capture OFDM symbol and subcarrier occupancy of the CSI-RS resource within a slot | |
| CDMType | Includes parameters to capture CDM value (1, 2, 4, or 8), CDM pattern (freq only, time and freq, time only) | |
| CSI-RS-Density | Density of CSI-RS resource measured in RE/port/PRB | e.g., 1/2, 1, >1 |
| CSI-RS-FreqBand | Includes parameters to enbale configuration of wideband and partial band CSI-RS | |
| Pc | Power offset of NZP CS-RS RE to PDSCH RE | |
| ScramblingID | Scambling ID | |

Referring to Table 23, a 5G or NR system may support beam measurement, reporting, and management based on a resource configuration.

As described in 2) DMRS, a DMRS is a reference signal transmitted for a specific terminal and is transmitted only when data is transmitted to the specific terminal. The DMRS may include a total of 8 DMRS ports. In LTE/LTE-A systems, ports from port 7 to port 14 are DMRS ports, and ports maintain orthogonality in order to prevent interference therebetween using code division multiplexing (CDM) or frequency division multiplexing (FDM), which will be described in more detail with reference to Equation 2. A reference signal sequence for a DMRS may be expressed as in Equation 2 below.

$$r(m) = \frac{1}{\sqrt{2}}(1 - 2 \cdot c(2m)) + j\frac{1}{\sqrt{2}}(1 - 2 \cdot c(2m+1)),$$

$$m = \begin{cases} 0, 1, \ldots, 12N_{RB}^{max,DL} - 1 & \text{normal cyclic prefix} \\ 0, 1, \ldots, 16N_{RB}^{max,DL} - 1 & \text{extended cyclic prefix} \end{cases}$$

Equation 2

In this case, c(i) is a pseudo-random sequence, and an initial state for a scrambling sequence of the DMRS is generated for each subframe through Equation 3.

$$c_{init} = (\lfloor n_s/2 \rfloor + 1) \cdot (2n_{ID}^{(nSCID)} + 1) \cdot 2^{16} + n_{SCID}$$

Equation 3

In this case, ns is a slot index of a frame and has an integer value between 0 and 19. In Equation 3, $n_{ID}^{(nSCID)}$ and $n_{SCID}$ are values related to the scrambling of the DMRS. $n_{ID}^{(nSCID)}$ corresponds to a virtual cell ID value and has an integer value between 0 and 503. Furthermore, $n_{SCID}$ corresponds to a scrambling ID value and has a value of 0 or 1.

In the 3GPP LTE Release 11 standard, as shown in Table 15, when additional scrambling ID necessary for a virtual cell ID is configured, any one of two values $n_{ID}^{(nSCID)}$ may be used depending on a value $n_{SCID}$. That is, when the value $n_{SCID}$ is 0, the virtual cell ID value has a value of scramblingIdentity-r11 pre-set through higher layer signaling, and when the value $n_{SCID}$ is 1, the virtual cell ID value has a value of scramblingIdentity2-r11 pre-set through higher layer signaling.

TABLE 24

DMRS-Config configuration field

```
-- ASN1START
DMRS-Config-r11 ::= CHOICE {
    release                 NULL,
    setup                   SEQUENCE {
        scramblingIdentity-r11    INTEGER (0..503),
        scramblingIdentity2-r11   INTEGER (0..503)
}
```

A reference signal sequence r(m) for the DMRS of Equation 2 is mapped to a resource element (RE) through Equation 4 when a PDSCH is allocated to nPRB with respect to an antenna port p=7, p=8, or p=7, 8, . . . v+6.

$$a_{k,l}^{(p)} = w_p(l') \cdot r(3 \cdot l' \cdot N_{RB}^{max,DL} + 3 \cdot n_{PRB} + m')$$

Equation 4

Here, $$w_p(i) = \begin{cases} \overline{w}_p(i) & (m' + n_{PRB}) \bmod 2 = 0 \\ \overline{w}_p(3-i) & (m' + n_{PRB}) \bmod 2 = 1 \end{cases}$$

$$k = 5m' + N_{sc}^{RB} n_{PRB} + k'$$

$$k' = \begin{cases} 1 & p \in \{7, 8, 11, 13\} \\ 0 & p \in \{9, 10, 12, 14\} \end{cases}$$

$$l = \begin{cases} l' \bmod 2 + 2 & \text{if in a special subframe with configuration ion 3, 4, 8 or 9(see Table 4.2-1)} \\ l' \bmod 2 + 2 + 3\lfloor l'/2 \rfloor & \text{if in a special subframe with configuration ion 1, 2, 6, or 7(see Table 4.2-1)} \\ l' \bmod 2 + 5 & \text{if not in a special subframe} \end{cases}$$

-continued $$l' = \begin{cases} 0, 1, 2, 3 & \text{if } n_1 \bmod 2 = 0 \text{ and in a} \\ & \text{special subframe with configuration} \\ & \text{ion 1, 2, 6, or 7(see Table 4.2-1)} \\ 0, 1 & \text{if } n_1 \bmod 2 = 0 \text{ and not in} \\ & \text{special subframe with configuration} \\ & \text{1, 2, 6, or 7(see Table 4.2-1)} \\ 2, 3 & \text{if } n_1 \bmod = 2 = 0 \text{ and not in} \\ & \text{special subframe with configuration} \\ & \text{1, 2, 6, or 7(see Table 4.2-1)} \end{cases}$$

$$m' = 0, 1, 2$$

where wp(i) is as shown in Table 16. In the above, Table 4.2-1 refers to LTE standard 3GPP TS 36.211.

TABLE 25

Sequence $\overline{w}_p(i)$ for normal CP

| Antenna port p | $[\overline{w}_p(0)\ \overline{w}_p(1)\ \overline{w}_p(2)\ \overline{w}_p(3)]$ |
|---|---|
| 7 | [+1 +1 +1 +1] |
| 8 | [+1 −1 +1 −1] |
| 9 | [+1 +1 +1 +1] |
| 10 | [+1 −1 +1 −1] |
| 11 | [+1 +1 −1 −1] |
| 12 | [−1 −1 +1 +1] |
| 13 | [+1 −1 −1 +1] |
| 14 | [−1 +1 +1 −1] |

In Table 25, a sequence wp(i) is an orthogonal cover code (OCC) for maintaining orthogonality between DMRS ports through code divisional multiplexing (CDM).

If multi-user multiple input multiple output (MU-MIMO) is supported in an LTE system before the 3GPP LTE Release 13 standard, in a conventional technology, up to two orthogonal transmission layers may be supported by using an OCC having a length of 2 and 12 DMRS REs per physical resource block (PRB) by taking into consideration only DMRS antenna port p=7 and 8. Furthermore, up to four quasi-orthogonal transmission layers are supported by using the value $n_{SCID}$. An antenna port in which the DMRS is transmitted, $n_{SCID}$, and the number of layers may be indicated by using Table 26 through 3 bits in DCI formats 2C and 2D.

[Table 26] Indication of Antenna Port(s), Scrambling Identity, and Number of Layers

TABLE 26

Indication of antenna port(s), scrambling identity, and number of layers

| One Codeword: Codeword 0 enabled, Codeword 1 disabled | | Two Codewords: Codeword 0 enabled, Codeword 1 enabled | |
|---|---|---|---|
| Value | Message | Value | Message |
| 0 | 1 layer, port 7, $n_{SCID} = 0$ | 0 | 2 layers, ports 7-8, $n_{SCID} = 0$ |
| 1 | 1 layer, port 7, $n_{SCID} = 1$ | 1 | 2 layers, ports 7-8, $n_{SCID} = 1$ |
| 2 | 1 layer, port 8, $n_{SCID} = 0$ | 2 | 3 layers, ports 7-9 |
| 3 | 1 layer, port 8, $n_{SCID} = 1$ | 3 | 4 layers, ports 7-10 |
| 4 | 2 layers, ports 7-8 | 4 | 5 layers, ports 7-11 |
| 5 | 3 layers, ports 7-9 | 5 | 6 layers, ports 7-12 |
| 6 | 4 layers, ports 7-10 | 6 | 7 layers, ports 7-13 |
| 7 | Reserved | 7 | 8 layers, ports 7-14 |

Referring to Table 26, a first column corresponds to a case where a PDSCH is scheduled by transmitting one codeword and a second column corresponds to a case where a PDSCH is scheduled by transmitting two codewords. Furthermore, in the first column, Value=4, 5, and 6 are used only for retransmission of the corresponding codeword. Furthermore, in the first column, Value=0, 1, 2, and 3 may be used to indicate DMRS information in MU-MIMO transmission. As shown in Table 17, in an LTE system before the 3GPP LTE Release 13 standard, up to two orthogonal transmission layers may be supported in the MU-MIMO transmission and up to four quasi-orthogonal transmission layers may be supported by using $n_{SCID}$.

In an LTE system before the 3GPP LTE Release 13 standard, up to four orthogonal DMRS ports are supported by using an OCC having a length of 4 based on an indication table of Table 27.

[Table 27] Indication of Antenna Port(s), Scrambling Identity, and Number of Layers

TABLE 27

Indication of antenna port(s), scrambling identity, and number of layers

| One Codeword: Codeword 0 enabled, Codeword 1 disabled | | Two Codewords: Codeword 0 enabled, Codeword 1 enabled | |
|---|---|---|---|
| Value | Message | Value | Message |
| 0 | 1 layer, port 7, $n_{SCID} = 0$ (OCC = 2) | 0 | 2 layer, port 7-8, $n_{SCID} = 0$ (OCC = 2) |
| 1 | 1 layer, port 7, $n_{SCID} = 1$ (OCC = 2) | 1 | 2 layer, port 7-8, $n_{SCID} = 1$ (OCC = 2) |
| 2 | 1 layer, port 8, $n_{SCID} = 0$ (OCC = 2) | 2 | 2 layer, port 7-8, $n_{SCID} = 0$ (OCC = 4) |
| 3 | 1 layer, port 8, $n_{SCID} = 1$ (OCC = 2) | 3 | 2 layer, port 7-8, $n_{SCID} = 1$ (OCC = 4) |
| 4 | 1 layer, port 7, $n_{SCID} = 0$ (OCC = 4) | 4 | 2 layer, port 11, 13, $n_{SCID} = 0$ (OCC = 4) |
| 5 | 1 layer, port 7, $n_{SCID} = 1$ (OCC = 4) | 5 | 2 layer, port 11, 13, $n_{SCID} = 1$ (OCC = 4) |
| 6 | 1 layer, port 8, $n_{SCID} = 0$ (OCC = 4) | 6 | 3 layer, port 7-9 |
| 7 | 1 layer, port 8, $n_{SCID} = 1$ (OCC = 4) | 7 | 4 layer, port 7-10 |
| 8 | 1 layer, port 11, $n_{SCID} = 0$ (OCC = 4) | 8 | 5 layer, port 7-11 |
| 9 | 1 layer, port 11, $n_{SCID} = 1$ (OCC = 4) | 9 | 6 layer, port 7-12 |
| 10 | 1 layer, port 13, $n_{SCID} = 0$ (OCC = 4) | 10 | 7 layers, ports 7-13 |
| 11 | 1 layer, port 13, $n_{SCID} = 1$ (OCC = 4) | 11 | 8 layers, ports 7-14 |
| 12 | 2 layers, ports 7-8 | 12 | Reserved |
| 13 | 3 layers, ports 7-9 | 13 | Reserved |
| 14 | 4 layers, ports 7-10 | 14 | Reserved |
| 15 | Reserved | 15 | Reserved |

Accordingly, a terminal may determine the number of layers allocated for transmission of a PDSCH, RE mapping, and a reference signal sequence, through DCI indicated by a base station based on Table 26 or Table 27, and may estimate a precoded channel to decode the PDSCH. In this case, the terminal decodes a DMRS by assuming that the same precoding is used in one RB when the precoding matrix index (PMI)/rank indicator (RI) reporting is not configured. Also, the terminal may perform decoding by determining that the same precoding is used in one precoding resource block group (PRG) when PMI/RI reporting is configured. In this case, a size of a precoding resource block unit varies according to a system bandwidth configured for the terminal. A size of a precoding resource block is defined in Table 28.

TABLE 28

| Size of precoding resource block | |
| --- | --- |
| System Bandwidth ($N_{RB}^{DL}$) | PRG Size (P') (PRBs) |
| ≤10 | 1 |
| 11-26 | 2 |
| 27-63 | 3 |
| 64-110 | 2 |

In an LTE system, channel estimation for data decoding using a DMRS may be performed, by using PRB bundling associated with a system bandwidth, within a PRG serving as a bundling unit.

Figure 17:
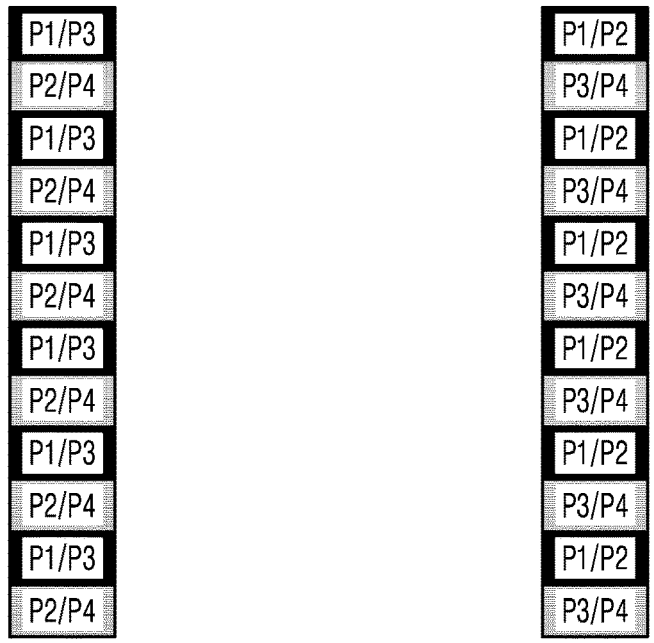
Figure 17:
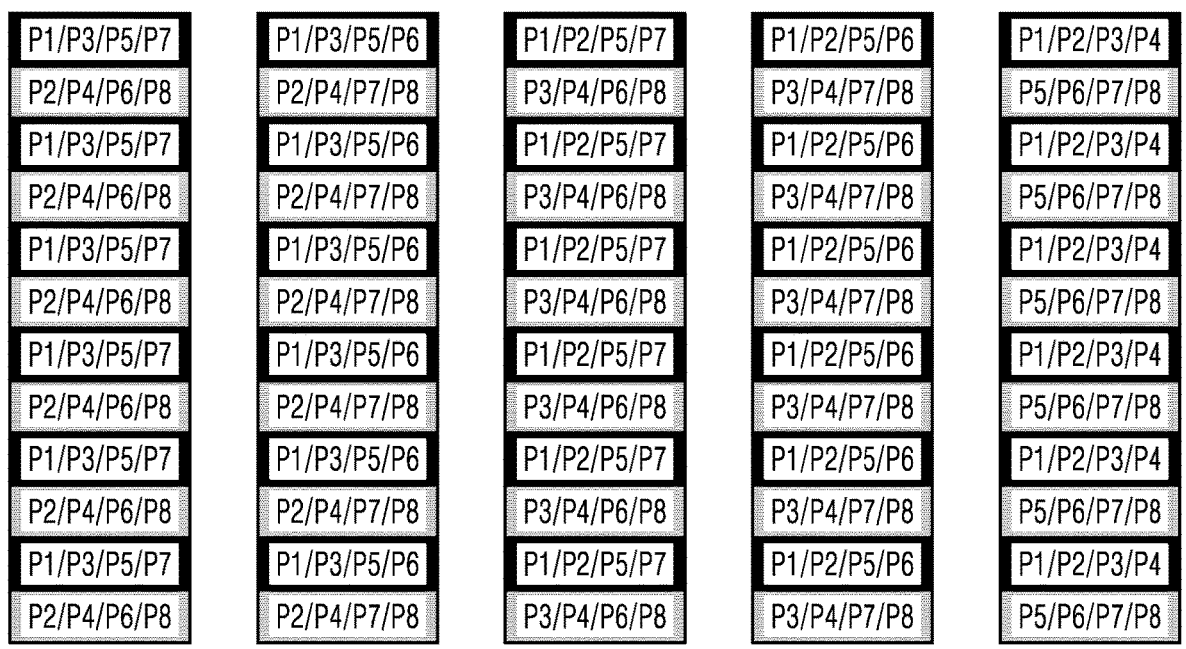
Figure 18:
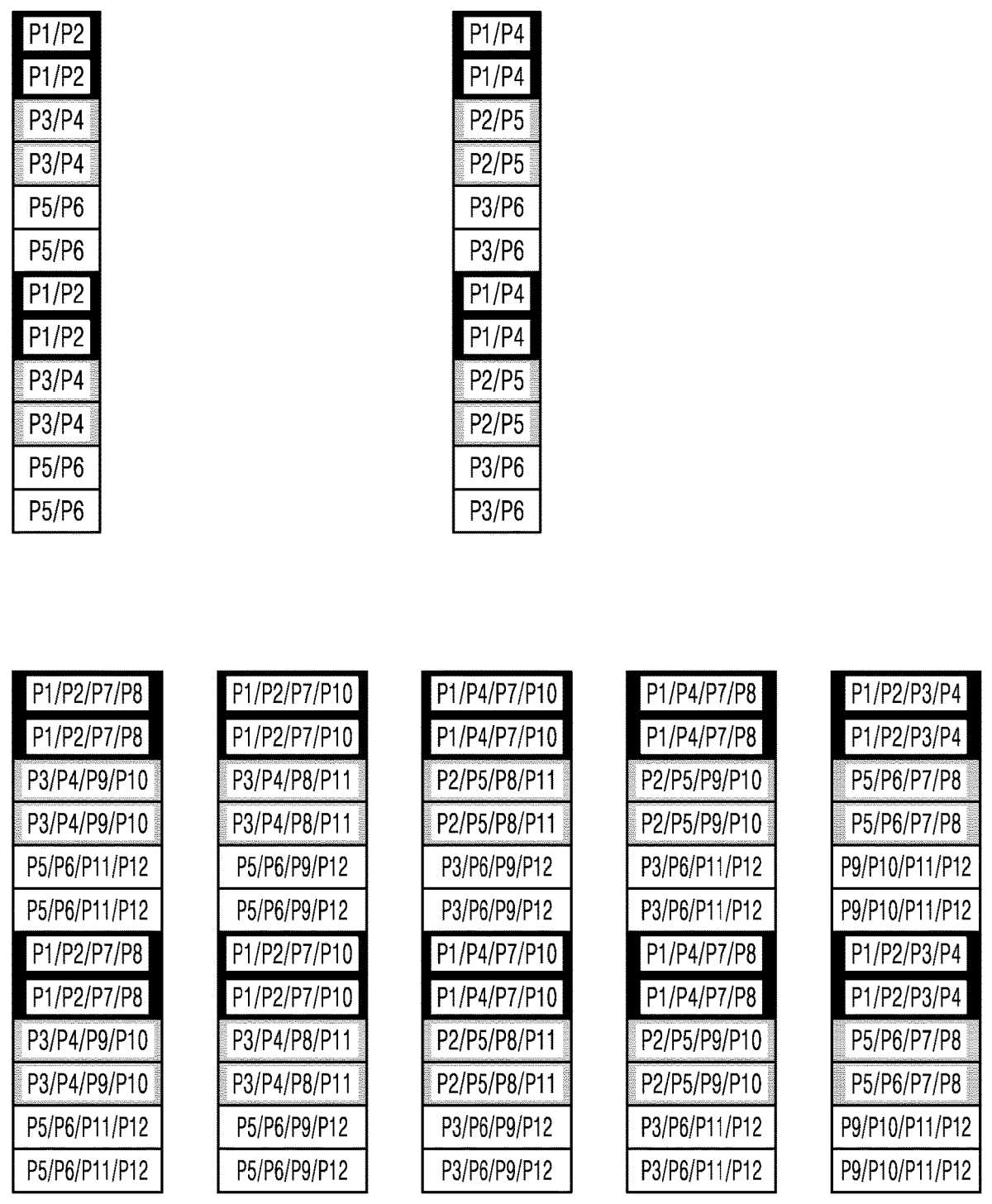

FIGS. 17 and 18 are diagrams illustrating a DMRS pattern that may be supported in a 5G or NR system.

Referring to FIGS. 17 and 18, two types of DMRS configurations (configuration 1 and configuration 2) may be supported in a 5G or NR system.

FIG. 17 is a diagram illustrating a DMRS configuration 1 in a 5G or NR system, which is a pattern based on a comb. According to the DMRS configuration 1, one or two symbols may be supported in one front-loaded DMRS. Also, up to eight orthogonal DMRS ports may be supported by using a comb having a size of 2, four cyclic shifts, and a time domain orthogonal cover code (TD-OCC).

FIG. 18 is a diagram illustrating a DMRS configuration 2 in a 5G or NR system, which is a pattern based on a frequency domain orthogonal cover code (FD-OCC). The DMRS configuration 2 has a lower reference signal density than the DMRS configuration 1. In the DMRS configuration 2, one or two symbols may be supported in one front-loaded DMRS like in the DMRS configuration 1, and up to 12 orthogonal DMRS ports may be supported by combining the FD-OCC with the TD-OCC.

In order to support such a DMRS pattern, an RRC configuration about how many additional DMRSs are to be configured in addition to a front-loaded DMRS may be supported. In addition, a configuration such as the maximum number of supported data transmission layers or the number of front-loaded DMRS symbols may be supported through RRC.

In addition to the RRC configuration, the number of antenna ports scheduled through DCI and the number thereof, a scrambling ID (SCID), and the number of antenna ports simultaneously scheduled to other terminals or a CDM group of ports may be indicated. Such indication(s) may be made through each individual DCI field or may be made together through one DCI field. Table 29 shows an antenna port and layer indication table when indicated through individual DCI, assuming one codeword transmission.

TABLE 29

| Indication of antenna port(s), scrambling identity, and number of layers | |
| --- | --- |
| Single codeword | |
| DMRS table Index | Serving port ID |
| 0 | 0 |
| 1 | 1 |
| 2 | 2 |
| 3 | 3 |
| 4 | 0, 2 |
| 5 | 0, 1 |
| 6 | 2, 3 |
| 7 | 0, 1, 2 |

In addition to Table 29, 1 bit DCI for indicating a scrambling ID and additional DCI for indicating MU-MIMO information may be transmitted to a terminal.

Unlike in Table 29, the number of antenna port scheduled through DCI the number thereof, an SCID, and the number of antenna ports simultaneously scheduled to other terminals, or a CDM group of ports may be indicated together by using one table. Table 29 shows indication of antenna port information transmitted for MU-MIMO transmission and antenna port and layer information based on one codeword.

TABLE 30

| Indication of antenna port(s), scrambling identity, and number of layers | | |
| --- | --- | --- |
| DMRS table Index | Serving port ID | UE assumption on possible co-scheduled ports |
| 0 | 0 | SU |
| 1 | 0 | 2 |
| 2 | 2 | 0 |
| 3 | 0 | 1, 2, 3 |
| 4 | 1 | 0, 2, 3 |
| 5 | 2 | 0, 1, 3 |
| 6 | 3 | 0, 1, 2 |
| 7 | 0, 2 | SU |
| 8 | 0, 1 | SU |
| 9 | 0, 1 | 2, 3 |
| 10 | 2, 3 | 0, 1 |
| 11 | 0, 1, 2 | SU |
| 12 | 0, 1, 2 | 3 |
| 13 | 0, 1, 2, 3 | SU |
| 14 | reserved | reserved |
| 15 | reserved | reserved |

As shown in Table 30, DMRS port and layer indication information and DMRS related information allocated to other terminals which are simultaneously transmitted may be indicated through one table.

Also, tables of Table 29 and Table 30 may all be supported by one terminal, and which table is to be used may be notified to the terminal through an indication or a configuration of a base station. In this case, RRC, MAC CE, or DCI may be used for corresponding signaling. Furthermore, Table 20 and Table 21 are merely examples, and the present disclosure is not limited thereto and various modifications may be made.

In a 5G or NR system, in order to improve channel estimation performance, how to bundle a DMRS pattern transmitted to a terminal through RRC, MAC CE and DCI in terms of a frequency resource may be configured. In a 5G or NR system, the terminal may transmit a size of a precoding resource block group (PRG) that is a PRB bundling size necessary to decode data through RRC and DCI. In a 5G or NR system, in order to support such an operation, an RRC configuration for dynamic PRG indication support through DCI may be supported.

Based on the RRC configuration, the following configuration candidates may be indicated as a PRG necessary to receive data through DCI to a base station.

1) 1 PRB: It is assumed that precoding is different for every PRB
2) 2 PRB: It is assumed that precoding is different for every two PRBs
3) 4 PRB: It is assumed that precoding is different for every four 4 PRBs
4) Scheduled Bandwidth: It is assumed that precoding is the same for PRBs where data is allocated to the terminal In this case, 1 PRB may not be supported from among the above candidates.

When a dynamic PRG indication through DCI through RRC is configured, a base station may configure a candidate to be indicated for each indication bit based on the above candidates in a terminal.

In this case, when DCI='0', only one candidate resource may be selected, and when DCI='1', one or more (e.g., two) candidate resources may be selected. Also, when DCI='1' and a plurality of candidate resources are selected, a determination may be made based on another implicit information, instead of a direction indication of the base station. In this case, the following implicit information may be used.

MU-MIMO transmission information: In a 5G or NR system, not only a terminal receiving data through DCI but also terminals receiving data together may be instructed on information about a DMRS port or a CDM group of a DMRS, and may determine which candidate resource is to be used based on the information. When the base station supports MU-MIMO transmission, because transmission power of the base station has to be divided and transmitted to a plurality of terminals in order to simultaneously transmit data to the terminals, an SINR of the DMRS may be reduced and thus DMRS channel estimation performance may be reduced. In this case, it is necessary to improve DMRS channel estimation performance by using a larger PRG size. However, in single-user MIMO (SU-MIMO) transmission, because data is transmitted only to one terminal, DMRS channel estimation may be performed by using only a smaller PRG size. Tables 31-1, 31-2, and 31-3 show such an operation of the terminal.

TABLE 31-1

PRG implicit determination method according to whether SUMIMO/MU-MIMO transmission is performed

| DCI = 0 | DCI = 1 | |
|---|---|---|
| Explicit determination | Implicit determination | |
| PRG | PRG (SU-MIMO) | PRG (MU-MIMO) |
| 2 | 4 | Scheduled BW |

TABLE 31-2

PRG implicit determination method according to co-scheduled CDM group indication

| DCI = 0 | DCI = 1 |
|---|---|
| Explicit determination | Implicit determintion |

TABLE 31-2-continued

PRG implicit determination method according to co-scheduled CDM group indication

| PRG | PRG (No co-scheduled CDM group) | PRG (Co-scheduled CDM group exists) |
|---|---|---|
| 2 | 4 | Scheduled BW |

TABLE 31-3

PRG implicit determination method according to co-scheduled CDM group indication

| DCI = 0 | DCI = 1 | |
|---|---|---|
| Explicit determination | Implicit determination | |
| PRG | PRG (No co-scheduled DMRS port) | PRG (Co-scheduled DMRS port exists) |
| 2 | 4 | Scheduled BW |

Although a PRG implicit determination method based on an indication between SU-MIMO/MU-MIMO, No co-scheduled CDM group/Co-scheduled CDM group, and No co-scheduled DMRS port/Co-scheduled DMRS port is shown in Tables 31-1, 31-2, and 31-3, a PRG implicit determination method using the number of layers allocated to other terminals, the number of co-scheduled CDM groups of other terminals, or the number of co-scheduled DMRS ports may be used. For example, a small PRG size may be used when up to two co-scheduled CDM groups are indicated, and a large PRG size may be used when three or more co-scheduled CDM groups are indicated. The number of layers, the number of CDM groups, and the number of DMRS ports may be defined as pre-set fixed numbers, or may be configured by the base station through RRC. Although the number of layers, the number of co-scheduled CDM groups, and the number of DMRS ports for data transmission of other terminals indicated to the terminal are described in the above embodiments, the number of layers, the number of co-scheduled CDM groups, and the number of DMRS ports allocated to both the terminal and other terminals may be defined in addition to the above embodiments.

DMRS indication information: As in a DCI field of Tables 29 and 30 and the above RRC configuration, the base station may transmit data to the terminal and may indicate layer and DMRS port allocation information for the data transmission to the terminal. A supported PRG size may vary according to such DMRS indication information. This criterion may include the number of OFDM symbols of an indicated front-loaded DMRS, the number of additional DMRSs, and the number of layers scheduled to the terminal. Tables 32-1, 32-2, and 32-3 show such support.

TABLE 32-1

PRG implicit determination method according to the number of OFDM symbols of front-loaded DMRS

| DCI = 0 | DCI = 1 | |
|---|---|---|
| Explicit determination | Implicit determination | |
| PRG | # of front-loaded DMRS OFDM symbol = 1 | # of front-loaded DMRS OFDM symbol = 2 |
| 2 | 4 | Scheduled BW |

TABLE 32-2

PRG implicit determination method according to the number of additional DMRS symbols

| DCI = 0 | DCI = 1 | |
|---|---|---|
| Explicit determination | Implicit determination | |
| PRG | PRG (No additional DMRS symbol) | PRG Additioial DMRS symbol exists) |
| 2 | 4 | Scheduled BW |

TABLE 32-3

PRG implicit determination method according to co-scheduled DMRS port indication

| DCI = 0 | DCI = 1 | |
|---|---|---|
| Explicit determination | Implicit determination | |
| PRG | PRG (rank <=2) | PRG (rank >2) |
| 2 | 4 | Scheduled BW |

Referring to Tables 32-1, 32-2, and 32-3, a PRG implicit determination method based on the number of front-loaded OFDM symbols, the number of additional DMRSs, and a transmission rank is disclosed. Alternatively, a PRG implicit determination method based on a DMRS type (configuration type 1/2) of a 5G or NR system and the number of transmitted codewords (e.g., 1 or 2) may be supported.

Also, all or some conditions from among the above DMRS conditions may be configured and selected through RRC by the base station.

Furthermore, which PRG is to be used may be configured through bitmap support through RRC or MAC CE for each indication state of a DMRS indication table of Tables 29 and 30. Table 33 shows a bitmap configuration through RRC based on Table 30.

TABLE 33

| 0: PRG candidate #1, 1: PRG candidate #2 |
|---|
| 0001111001101000 |

Referring to Table 33, a size of a bitmap may be the number of all states supported in a DMRS table or the number except reserved bits. Also, the bitmap may be generated by first mapping an MSB from a DMRS port and layer indication field state 0 or by first mapping an LSB.

Bandwidth part size: A PRG size for receiving data may be determined according to a size of a bandwidth part that is configured for the terminal or configured and then activated.

TABLE 34

PRG implicit determination method according to bandwidth part size

| DCI = 0 | DCI = 1 | |
|---|---|---|
| Explicit determination | Implicit determination | |
| PRG | PRG (BW part <=26) | PRG (BW part >27) |
| 2 | 4 | Scheduled BW |

Bandwidth part size and RRC configuration-based subband size: An N R or 5G system may support one from among a size of a bandwidth part that is configured for the terminal or configured and then activated and a subband size shown in Table 35 according to an RRC configuration (1st value/2nd value).

TABLE 35

| Carrier bandwidth part (PRBs) | Subband Size (PRBs) : $1^{st}$ value, $2^{nd}$ value |
|---|---|
| 2-60 | 4, [8] |
| 61-100 | 8, [16] |
| 101-200 | [12], [24] |
| 201-275 | 16, [32] |

Referring to Table 35, a PRG value may be determined according to whether a 1st value is configured to be used or a 2nd value is configured to be used in the subband size through RRC. For example, in the case of the 1st value, because frequency selective precoding is performed easily, a smaller PRG value may be used, and in the case of the 2nd value, because the subband size is large and the probability of frequency selective precoding and a frequency unit thereof are relatively large, a larger PRG value may be used.

Scheduled bandwidth: The terminal may be supported to determine a PRG value according to a size of a bandwidth allocated to receive data. A plurality of PRGs are required to support frequency selective precoding when the base station transmits data. Although a large PRG size (e.g., 4 PRBs) may be supported when a bandwidth allocated to the terminal is large, when a bandwidth is not sufficient, a frequency selective precoding gain needs to be secured through a small PRG size. Accordingly, because a PRG size is determined according to a size of a data resource region allocated to the terminal, when an allocated data region is small, a frequency selective precoding gain may be increased through a small PRG size; and when a data region is sufficiently large, a frequency selective precoding gain and DMRS channel estimation performance may be improved through a large PRG size. Table 36 shows a PRG determination method based on a scheduled bandwidth.

TABLE 36

| DCI = 0 | DCI = 1 | |
|---|---|---|
| Explicit determination | Implicit determination | |
| PRG | PRG (Scheduling BW <=X) | PRG (Scheduling BW >7) |
| 2 | 4 | Scheduled BW |

Accordingly, a scheduling bandwidth value for determining a PRG size (e.g., X PRBs or X PRGs) may be determined, and in this case, a method of determining a scheduling bandwidth may be as follows.

1) X value necessary to determine a PRG size is pre-configured: An X value necessary to determine a PRG size may be pre-configured, and the terminal may operate according to the pre-configured X value. For example, when a data region scheduled to the terminal is less than X or equal to or less than X, a smaller value from among configured PRG candidate values may be used, and when a data region is greater than X or equal to or greater than X, a larger value from among the configured PRG candidate values may be used. The X value may be defined in the standard.

2) X value necessary to determine a PRG size varies according to a bandwidth part size: An X value necessary to determine a PRG size may vary according to a size of a bandwidth part. For example, when a bandwidth part is a relative wideband, the terminal may perform channel estimation assuming a wideband. Accordingly, when a data region scheduled to the terminal is less than X or equal to or less than X, a smaller value from among configured PRG candidate values may be used, and when a data region is greater than X or equal to or greater than X, a larger value from among the configured PRG candidate values may be used. The X value may be determined according to Table 37. Also, such content may be specified in the standard.

TABLE 37

| Carrier bandwidth part (PRBs) | Scheduling BW threshold |
|---|---|
| 24-60 | 20 |
| 61-100 | 60 |
| 101-200 | 100 |
| 201-275 | 200 |

Furthermore, an X value may be determined through an equation instead of a table such as Table 36. For example, when ⅔ or more of a configured bandwidth part is scheduled to the terminal, the terminal may use a larger PRG value. As such, when a PRG value is determined based on a bandwidth part, a threshold value may be pre-configured (e.g., ⅔), or may be configured through RRC. The pre-configured value may be specified in the standard.

3) X value necessary to determine a PRG size is configured by the base station through RRC: An X value necessary to determine a PRG size may be indicated by the base station to the terminal through RRC. The terminal may receive the X value and may determine a PRG size. For example, when a scheduled data region is less than X or equal to or less than X, a smaller value from among configured PRG candidate values may be used, and when a data region is greater than X or equal to or greater than X, a larger value from among the configured PRG candidate values may be used. When a scheduled data region is greater than X, the terminal may disregard a value greater than a bandwidth (BW) part size. Alternatively, the terminal may use a largest value from among PRG candidate values.

4) X value necessary to determine a PRG size is recommended or indicated by the terminal to the base station: The terminal may recommend, report, or indicate an X value necessary to determine a PRG size to the base station in consideration of a channel state between the base station and the terminal, transmission/reception capability, and implementation. In this case, the recommending, reporting, or indicating may be performed based on UE capability, or may be performed based on RRC, a PUCCH, or a PUSCH.

5) PDCCH REG bundling size: The terminal may implicitly determine a size of a PRG necessary to transmit a PDSCH based on a PRG size assumed when the terminal receives a control channel through a PDCCH.

In an embodiment, a wireless communication system may support one method or a plurality of methods from among the above implicit PRG determination methods. When the wireless communication system supports a plurality of methods, the base station may configure the terminal to select and use one of the plurality of PRG determination methods through RRC.

In an embodiment, when DCI='1', a scheduled bandwidth may not be supported in a plurality of PRG candidate value configuration methods, or only 2 PRBs and 4 PRBs may be supported. The scheduled bandwidth may be for improving estimation performance and reducing terminal complexity necessary for channel estimation through discrete Fourier transform (DFT)-based channel estimation, when the terminal is configured in almost all areas of a bandwidth part. In this case, using the scheduled bandwidth may not be suitable for frequency selective precoding. Accordingly, in this case, even when DCI='1', only 2 PRBs and 4 PRBs may be configured.

In contrast, when DCI='1', a scheduled bandwidth may be included in a plurality of PRG candidate value configuration methods, and then a value such as 2 PRBs or 4 PRBs may be configured. Because using the scheduled bandwidth is suitable for wideband precoding, when the scheduled bandwidth may be included, and then a value such as 2 PRBs or 4 PRBs may be configured.

In this case, a PRB bundling-related configuration and indication may be configured and indicated for each bandwidth part.

An NR or 5G system may support channel state reporting for URLLC data transmission of FIG. 7. Referring to FIG. 7, time-frequency resources that are radio resources of a wireless communication system may be operated as eMBB, forward-compatible resource (FCR), and URLLC candidate resources. A transmission method of each resource may vary according to a need of a service, and thus inference characteristics may also vary. For example, because URLLC requires high reliability, a large number of resources may be used when compared to the amount of transmitted data. Also, because URLLC data has a higher priority than data of other services, resources allocated to a terminal at a time when the URLLC data has to be transmitted may be preferentially occupied. Accordingly, in the resources, a change in a frequency band may be relatively small when compared to resources in which eMBB acts as interference, and thus interference prediction of a base station may be relatively easy. Also, although not shown in FIG. 7, when a service of interference resources is mMTC, because a terminal having relatively low power repeatedly transmits data to improve coverage, the amount of interference may be small when compared to that of a URLLC terminal and this may be relatively advantageous for data transmission of an eMBB terminal. Accordingly, a channel state measurement and reporting method that may consider such a situation is required.

In the case of channel state information, URLLC has a different requirement for an operation when compared to eMBB. In other words, while eMBB operates at a block error rate (BLER) of 10%, URLLC may require high reliability such as 1-10-5 due to its characteristics, and thus may operate at an error probability of 10-5. However, a CQI of a current LTE system is not suitable for link adaptation for URLLC because only a modulation and coding scheme (MCS) that is operable at a BLER of 10% has to be reported. Accordingly, when specific resources are configured for URLLC, information such as CQI or MCS and coding rate suitable for the corresponding service may be reported.

In an embodiment, in addition to a CQI having different reliability for URLLC, a channel state indicator (CSI) for URLLC may support a CQI table supporting a lower modulation and coding rate. Tables 38, 39, and 40 are a CQI table for 64QAM-based data transmission, a CQI table for 256QAM-based data transmission, and a CQI table for narrowband IoT (NB-IOT) support.

TABLE 38

| CQI table for middle data rate | | | |
|---|---|---|---|
| CQI index | modulation | code rate × 1024 | efficiency |
| 0 | | out of range | |
| 1 | QPSK | 78 | 0.1523 |

TABLE 38-continued

CQI table for middle data rate

| CQI index | modulation | code rate × 1024 | efficiency |
|---|---|---|---|
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

TABLE 39

CQI table for high data rate

| CQI index | modulation | code rate × 1024 | efficiency |
|---|---|---|---|
| 0 | | out of range | |
| 1 | QPSK | 78 | 0.1523 |
| 2 | QPSK | 193 | 0.3770 |
| 3 | QPSK | 449 | 0.8770 |
| 4 | 16QAM | 378 | 1.4766 |
| 5 | 16QAM | 490 | 1.9141 |
| 6 | 16QAM | 616 | 2.1063 |
| 7 | 64QAM | 466 | 2.7305 |
| 8 | 64QAM | 567 | 3.3223 |
| 9 | 64QAM | 666 | 3.9023 |
| 10 | 64QAM | 772 | 4.5234 |
| 11 | 64QAM | 873 | 5.1152 |
| 12 | 256QAM | 711 | 5.5547 |
| 13 | 256QAM | 797 | 6.2266 |
| 14 | 256QAM | 885 | 6.9141 |
| 15 | 256QAM | 948 | 7.4063 |

TABLE 40

CQI table for low data rate and high reliability

| CQI index | modulation | code rate × 1024 × $R^{Cs1}$ | efficiency |
|---|---|---|---|
| 0 | | out of range | |
| 1 | QPSK | 40 | 0.0781 |
| 2 | QPSK | 78 | 0.1523 |
| 3 | QPSK | 120 | 0.2344 |
| 4 | QPSK | 193 | 0.3770 |
| 5 | QPSK | 308 | 0.6016 |
| 6 | QPSK | 449 | 0.8770 |
| 7 | QPSK | 602 | 1.1758 |
| 8 | 16QAM | 378 | 1.4766 |
| 9 | 16QAM | 490 | 1.9141 |
| 10 | 16QAM | 616 | 2.4063 |
| 11 | Reserved | Reserved | Reserved |
| 12 | Reserved | Reserved | Reserved |
| 13 | Reserved | Reserved | Reserved |
| 14 | Reserved | Reserved | Reserved |
| 15 | Reserved | Reserved | Reserved |

Tables 38, 39, and 40 are respectively CQI tables for a middle data rate, a high data rate, and a low data rate and high reliability. In the case of channel state information configured or used for eMBB, a plurality of CQI tables may all be configured. However, in the case of channel state information used for URLLC, it may not be necessary to consider a high modulation order or coding rate in consideration of high reliability required by URLLC. Accordingly, for channel state information for URLLC, only a CQI table maximally supporting a middle data rate (64QAM) or a low data rate and high reliability (16QAM) from among a plurality of CQI tables may be configured. Such a CQI table configuration may be supported by using the following methods.

1) CQI table configuration method 1 of high reliability: direct configuration through an independent RRC field configuration 2) CQI table configuration method 2 of high reliability: indirect configuration through an RRC field configuration along with a CQI table of high reliability 3) CQI table configuration method of high reliability: direct configuration through an independent DCI field configuration 4) CQI table configuration method of high reliability: indirect configuration through a DCI field configuration along with a CQI table of high reliability The CQI table configuration method 1 is a method of directly configuring a CQI table through an independent RRC field configuration. In this case, a CQI table considering high reliability and a CQI table based on an independent configuration field may be configured. In the CQI table configuration method 1, a base station may freely configure a CQI table for URLLC according to an implementation method. Also, channel state reporting may be performed based on a CQI table that varies according to a terminal for URLLC.

The CQI table configuration method 2 is a method of indirectly configuring a CQI table through an RRC field configuration along with a CQI table of high reliability. URLLC requires both a CQI table having high reliability and a low modulation and coding rate. Hence, when channel state information is divided and configured, an overhead for the configuration may increase. Accordingly, when channel state information is simultaneously configured, a terminal may support channel state information reporting for URLLC. In this case, only one CQI table pre-defined from among a plurality of tables may be supported, unlike in the CQI table configuration method 1. The one pre-defined CQI table may be defined in the standard.

The CQI table configuration method 3 is a method of directly configuring a CQI table through an independent DCI field configuration. In this case, a CQI table considering high reliability and a CQI table based on an independent configuration field may be configured. In this case, a base station may freely configure a CQI table for URLLC according to an implementation method. Also, when necessary, eMBB and URLLC may be dynamically changed or a target data rate of eMBB may be dynamically changed, to report channel state information.

The CQI table configuration method 4 is a method of indirectly configuring a table through an RRC field configuration along with a CQI table of high reliability. URLLC requires both a CQI table of high reliability and a low modulation and coding rate. Hence, when channel state information is divided and configured, an overhead for the configuration may increase. Accordingly, when channel state information is simultaneously configured, a terminal may support channel state information reporting for URLLC. In this case, when necessary, eMBB and URLLC may be dynamically changed or a target data rate of eMBB may be dynamically changed, to report channel state information. Also, in this case, only one CQI table pre-defined from among a plurality of tables may be supported, unlike in the CQI table configuration method 1. The one pre-defined CQI table may be defined in the standard.

Although three CQI tables are described in Tables 37, 38, and 39, there may be more CQI tables. Also, although a CQI table supporting a high data rate supports up to 256QAM in the above example, the present disclosure is not limited thereto and the CQI table may support 1024QAM. Furthermore, although a CQI table for providing high reliability supports up to 16QAM in the above example, only a lower modulation rate, e.g., only quadrature phase shift keying (QPSK), may be supported.

In addition to a CQI table for providing high reliability, a reliability may be configured for channel state reporting for URLLC. For example, when a reliability of 1-10-5 and 1-10-3 is configured in a CQI table, even in URLLC, a service requiring relatively high reliability and a service requiring relatively low reliability and a high data rate may be distinguished and channel state reporting may be supported.

As described above, channel state reporting including a CQI assuming general reliability (e.g., 10%) for eMBB data transmission may exist, and channel state reporting including a CQI assuming high reliability (e.g., 0.001%) for URLLC transmission may co-exist. In this case, as shown in FIG. 19, a collision may occur between periodic/semi-persistent/aperiodic channel state reportings and channel state reporting may not be reported, which will be described with reference to FIG. 19.

Figure 19:
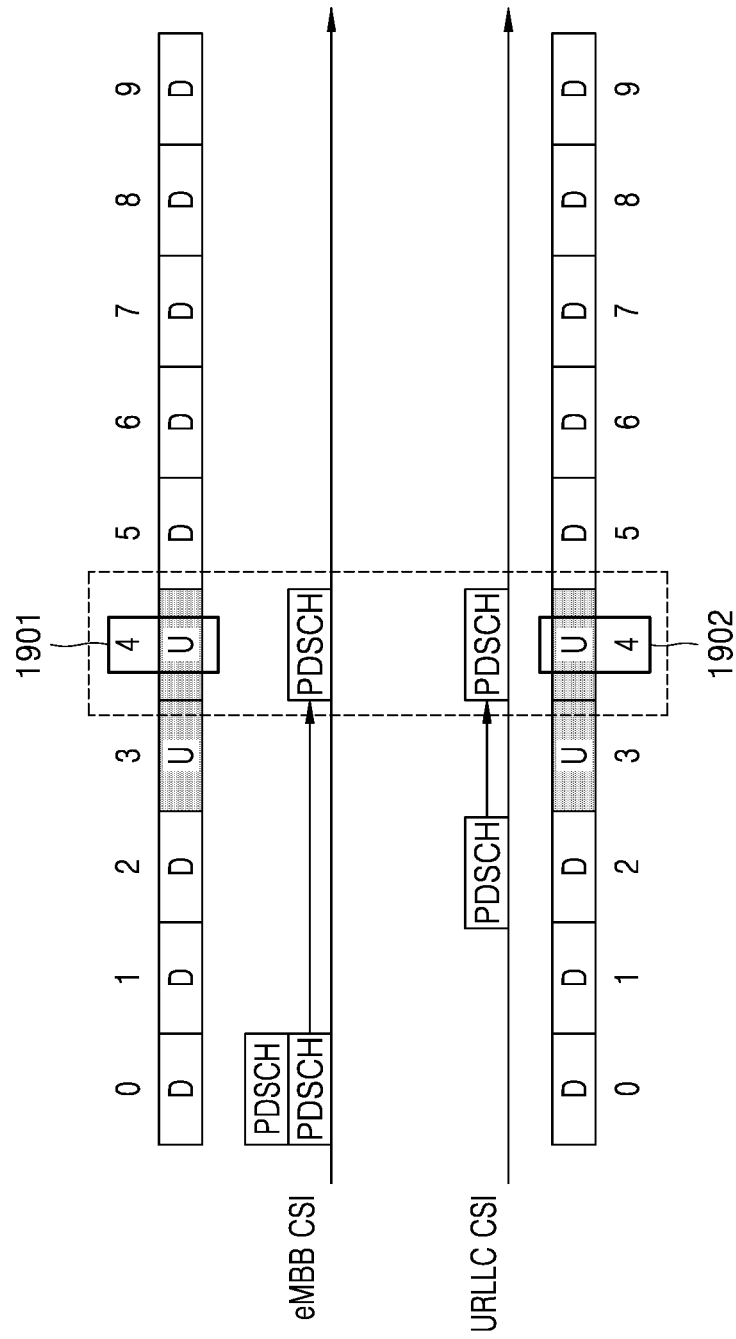
FIG. 19 is a diagram for describing a collision between a plurality of channel state reports.

FIG. 19 is a diagram for describing a collision between a plurality of channel state reportings.

Referring to FIG. 19, a transmission time of a slot (4th slot 1901) at which eMBB CSI is transmitted and a transmission time of a slot (4th slot 1902) at which URLLC CSI is transmitted are transmitted are the same, and thus a collision occurs. In this case, an operation of dropping one channel state reporting is required, and may be supported as follows.

1) Channel state reporting drop method 1: Channel state reporting including a CQI assuming low reliability is dropped.

2) Channel state reporting drop method 2: Channel state reporting including a CQI assuming high reliability is dropped.

3) Channel state reporting drop method 3: Channel state reporting having a long reporting period is dropped.

4) Channel state reporting drop method 4: A channel state reporting type to be dropped is configured through RRC.

The channel state reporting drop method 1 is a method of dropping channel state reporting including a CQI assuming low reliability. URLLC data transmission requires high reliability as described above. Accordingly, when a long time elapses after channel state reporting is received, it may seriously affect URLLC data transmission and may cause a high error rate. Accordingly, when a channel state reporting collision occurs, channel state reporting transmission for URLLC may always be guaranteed by dropping channel state reporting for eMBB.

The channel state reporting drop method 2 is a method of dropping channel state reporting including a CQI assuming high reliability. URLLC data transmission requires a low modulation and coding rate in order to ensure high reliability as described above. Accordingly, in the case of channel state reporting for URLLC, a channel state may be relatively robust and may not be greatly changed. Accordingly, channel state reporting including a CQI for eMBB in which a channel state often varies may be preferentially sent.

The channel state reporting drop method 3 is a method of dropping channel state reporting having a long reporting period. As described above, in the case of channel state reporting for URLLC, a channel state may be relatively robust and may not be greatly changed. Accordingly, when a long period is configured for channel state reporting for URLLC, a channel state reporting overhead may be reduced. In this case, when channel state reporting for eMBB and channel state reporting for URLLC collide each other and the channel state reporting for URLLC is not made, because the channel state reporting for URLLC is outdated and transmission is impossible, the channel state reporting for URLLC is essential. In contrast, when a short period is configured for URLLC transmission, because loss may be small even though one reporting is not made, dropping may be supported in the case of a configuration of a short period.

The channel state reporting drop method 4 is a method of configuring a channel state reporting type to be dropped through RRC. Because there may be various implementation methods such as the above channel state reporting drop methods, a channel state reporting drop method may be configured through RRC, thereby providing selection flexibility to a base station. According to an RRC configuration, channel state reporting to be dropped may be selected according to high reliability, middle reliability, or low reliability, or channel state reporting to be prioritized may be selected.

Furthermore, a channel state reporting drop method may be differently applied according to a channel state reporting type. For example, in periodic channel state reporting or semi-persistent channel state reporting, because a terminal periodically reports a channel state to a base station, the channel state reporting drop method 2 may be supported and channel state reporting may be prioritized. In contrast, in aperiodic channel state reporting, it is determined that transmission of URLLC data is urgently required, and thus URLLC channel state reporting may be prioritized through the channel state reporting drop method 1.

Figure 20:
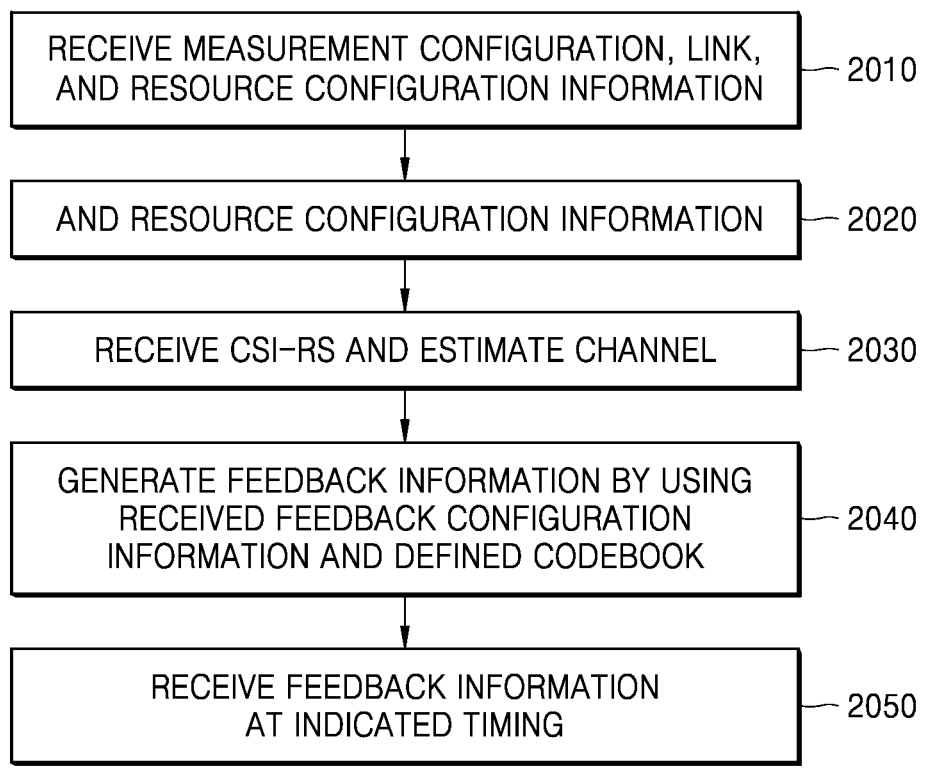
FIG. 20 is a diagram illustrating an operating method of a terminal, according to an embodiment.

FIG. 20 is a diagram illustrating an operating method of a terminal, according to an embodiment.

Referring to FIG. 20, in operation 2010, a terminal receives measurement configuration and resource configuration information. The information may include information about a reference signal for measuring a channel. For example, the information about the reference signal may include at least one of a type of the reference signal, the number of ports of the reference signal, a type of a codebook, N1 and N2 that are the number of antennas per dimension, Q1 and Q2 that are oversampling factors per dimension, one subframe config for transmitting multiple CSI-RSs, a plurality of resource configs for configuring a position, codebook subset restriction-related information, CSI reporting-related information (a CQI table type or CQI reliability), a CSI-process index, a candidate number to indicate a timing between aperiodic channel state reporting trigger and aperiodic channel state reporting, and transmission power information (PC).

In operation 2020, the terminal configures one feedback configuration information through a channel state reporting configuration used in a measurement configuration. Whether to perform the PMI/CQI reporting, a period and offset, an RI period and offset, a CRI period and offset, whether it is a wideband or subband, a submode, a channel state reporting type, and a candidate number to indicate a timing between aperiodic channel state reporting trigger and aperiodic channel state reporting may be configured in the information.

In operation 2030, when the terminal receives the reference signal based on the information, the terminal estimates a channel between an antenna of a base station and a receiving antenna of the terminal based on the reference signal.

Next, in operation 2040, the terminal may generate a feedback information rank, a PMI, and a CQI by using the received feedback configuration based on the estimated channel, and may select an optimal CRI based on the feedback information rank, the PMI, and the CQI.

In operation 2050, the terminal transmits the feedback information to the base station at a feedback timing determined according to a timing indication between aperiodic channel state reporting trigger and aperiodic channel state reporting, and the aperiodic channel state reporting trigger or a feedback configuration of the base station, thereby finishing the channel feedback generation and reporting.

Figure 21:
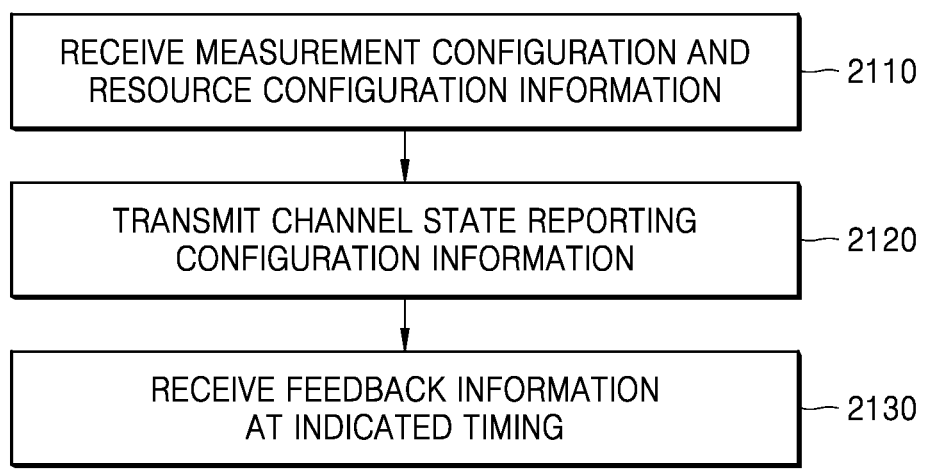
FIG. 21 is a diagram illustrating an operating method of a base station, according to an embodiment.

FIG. 21 is a diagram illustrating an operating method of a base station, according to an embodiment.

Referring to FIG. 21, in operation 2110, a base station transmits configuration information about a channel state reporting configuration and a reference signal for measuring a channel to a terminal. At least one of a type of each reference signal, a time, a frequency resource position, a service type, a supported feedback type, and a measurement subset may be configured in the configuration information, and to transmit the reference signal based thereupon, the configuration information may include at least one of the number of ports of the reference signal, N1 and N2 that are the number of antennas per dimension, O1 and O2 that are oversampling factors per dimension, one subframe config for transmitting multiple reference signals, a plurality of resource configs for configuring a position, codebook subset restriction-related information, CSI reporting-related information (a CQI table type or CQI reliability), a CSI-process index, and transmission power information (PC).

Next, in operation 2120, the base station transmits, to the terminal, feedback configuration information based on at least one CSI-RS. A PMI/CQI period and offset, an RI period and offset, a CRI period and offset, whether it is a wideband or subband, a submode, and a candidate number to indicate a timing between aperiodic channel state reporting trigger and aperiodic channel state reporting may be configured in the information. Next, the base station transmits the configured CSI-RS to the terminal. The terminal estimates a channel per antenna port and estimates an additional channel for a virtual resource based on the channel. The terminal determines feedback, generates a CRI, a PMI, an RI, and a CQI corresponding to the feedback, and transmits the CRI, the PMI, the RI, and the CQI to the base station.

In operation 2130, the base station receives feedback information from the terminal at a determined timing, and uses the feedback information to determine a channel state between the terminal and the base station.

Figure 22:
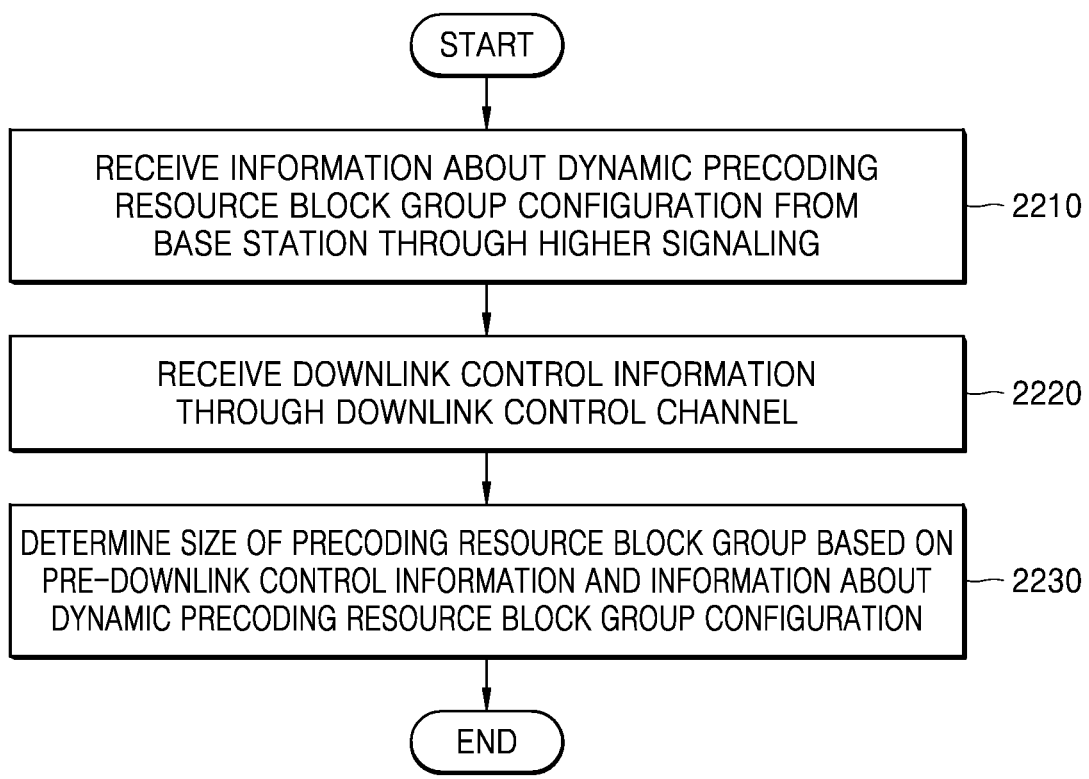
FIG. 22 is a diagram illustrating an operating method of a terminal, according to another embodiment.

FIG. 22 is a diagram illustrating an operating method of a terminal, according to another embodiment.

In operation 2210, a terminal receives information about a dynamic PRG configuration from a base station through higher layer signaling. In an embodiment, downlink control information may include information indicating to explicitly determine a size of a PRG or information indicating to implicitly determine a size of a PRG. Also, the downlink control information may include at least one information from among MU-MIMO transmission information and reference signal indication information.

In an embodiment, the MU-MIMO transmission information may include at least one of whether SU-MIMO or MU-MIMO transmission is performed, a CDM group of a reference signal received by the terminal, and port information of the reference signal received by the terminal. Also, the reference signal indication information may include at least one of the number of OFDM symbols of the reference signal, the number of additional reference signals, a rank, a type of the reference signal, and the number of transmitted codewords.

Furthermore, in an embodiment, the terminal may receive a bitmap including information about a size of a PRG through higher layer signaling. Also, information indicating a method of determining a size of a PRG may be received from the base station through higher layer signaling.

In operation 2220, the terminal receives the downlink control information through a downlink control channel.

In operation 2230, the terminal determines a size of a PRG based on pre-downlink control information and the information about the dynamic PRG configuration. In an embodiment, when the downlink control information includes information indicating to implicitly determine a size of a PRG, a size of a PRG may be determined based on at least one piece of information from among the MU-MIMO transmission information and the reference signal indication information. Also, the terminal may determine a size of a PRG based on at least one of a bitmap, a bandwidth part configured in the terminal, and a bandwidth scheduled to the terminal. Also, the terminal may determine a size of a PRG by comparing the bandwidth scheduled to the terminal with a threshold value, and in this case, the threshold value may include at least one of a pre-determined value, and a value changed according to a size of the bandwidth part, received from the base station through higher layer signaling, or reported by the terminal. Also, the terminal may determine a size of a PRG based on a size of a PRG assumed when the terminal receives the downlink control channel.

Figure 23:
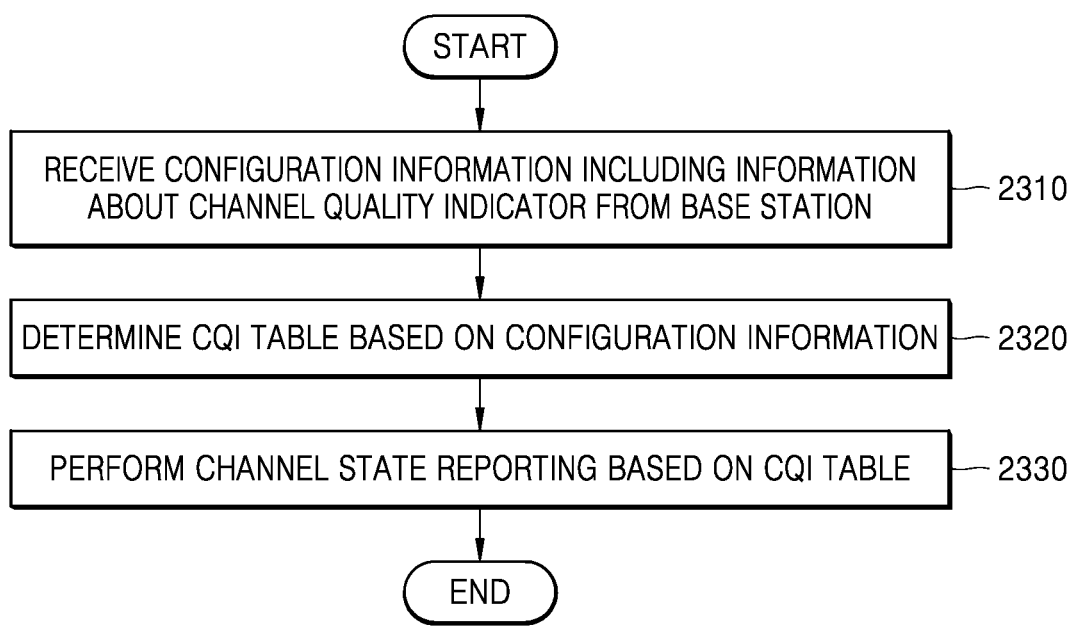
FIG. 23 is a diagram illustrating an operating method of a terminal, according to another embodiment.

FIG. 23 is a diagram illustrating an operating method of a terminal, according to an embodiment.

In operation 2310, a terminal receives configuration information including information about a channel quality indicator from a base station. In an embodiment, the configuration information may be determined based on at least one of a reliability required to transmit data and a service type provided by the base station. In an embodiment, the terminal may receive information about channel state reporting to be dropped from the base station.

In operation 2320, the terminal determines a CQI table based on the configuration information.

In operation 2330, the terminal performs channel state reporting based on the CQI table. In an embodiment, the terminal may determine whether a collision occurs between a plurality of channel state reportings, and when a collision occurs between a plurality of channel state reportings, may drop at least one of the plurality of channel state reportings. In this case, the terminal may drop at least one of the plurality of channel state reportings based on one of a reporting period and a reliability required to transmit data. Also, the terminal may drop at least one of the plurality of channel state reportings based on information about channel state reporting to be dropped. A type of the plurality of channel state reportings may include at least one of periodic channel state reporting, semi-persistent channel state reporting, and aperiodic channel state reporting.

Figure 24:
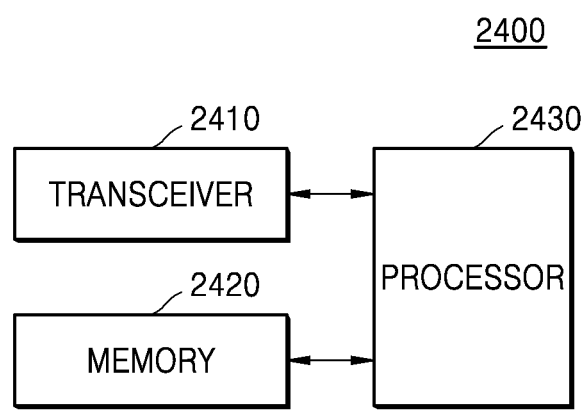
FIG. 24 is a block diagram illustrating a configuration of a terminal according to an embodiment.

FIG. 24 is a block diagram illustrating a configuration of a terminal according to an embodiment.

Referring to FIG. 24, a terminal 2400 may include a transceiver 2410, a memory 2420, and a processor 2430. The transceiver 2410, the memory 2420, and the processor 2430 of the terminal 2400 may operate according to a communication method of the terminal 2400. However, elements of the terminal 2400 are not limited to those illustrated in FIG. 24. For example, the terminal 2400 may include elements more or fewer than those illustrated in FIG. 24. In addition, the transceiver 2410, the memory 2420, and the processor 2430 may be implemented as one chip.

The transceiver 2410 may transmit/receive a signal to/from a base station. The signal may include control information and data. To this end, the transceiver 2410 may include a radio frequency (RF) transmitter that up-converts and amplifies a frequency of a transmitted signal and an RF receiver that performs low-noise amplification on a received signal and down-converts a frequency. However, this is merely an example of the transceiver 2410, and elements of the transceiver 2410 are not limited to the RF transmitter and the RF receiver.

Also, the transceiver 2410 may receive a signal through a wireless channel, may output the signal to the processor 2430, and may transmit a signal output from the processor 2430 through the wireless channel.

The memory 2420 may store a program and data necessary to operate the terminal 2400. Also, the memory 2420 may store control information or data included in a signal obtained by the terminal 2400. The memory 2420 may include a storage medium such as a read-only memory (ROM), a random-access memory (RAM), a hard disk, a compact disc-ROM (CD-ROM), or a digital versatile disk (DVD), or a combination of storage media. Also, the memory 2420 may include a plurality of memories. In an embodiment, the memory 2420 may store a program for supporting beam-based cooperation communication.

The processor 2430 may control a series of processes so that the terminal 2400 operates according to the above embodiment. The processor 2430 may include a plurality of processors. In an embodiment, by executing a program stored in the memory 2420, the processor 2430 may receive information about a dynamic PRG configuration from the base station through higher layer signaling, may receive downlink control information through a downlink control channel, and may determine a size of a PRG based on the downlink control information and the information about the dynamic PRG configuration. Also, the processor 2430 may receive configuration information including information about a CQI from the base station, may determine a CQI table based on the configuration information, and may perform channel state reporting based on the CQI table.

In an embodiment, the processor 2430 may control feedback information to be generated according to information allocated from the base station, and may control the transceiver 2410 to feed generated channel information back to the base station according to timing information allocated from the base station. Also, the processor 2430 may determine a time-frequency location of a resource through the feedback information and a service received from the base station, may check necessary feedback information through related CSI-RS and feedback allocation information, and may estimate a channel by using a received CSI-RS based on the feedback information.

Also, the processor 2430 may measure at least one reference signal received through the transceiver 2410, and may generate the feedback information according to feedback configuration information. Furthermore, the processor 2430 may control the transceiver 2410 to transmit the generated feedback information to the base station at a feedback timing according to the feedback configuration information.

In an embodiment, the processor 2430 may receive the CSI-RS from the base station, may generate the feedback information based on the received CSI-RS, and may transmit the generated feedback information to the base station. In this case, the processor 2430 may select each precoding matrix for each antenna port group of the base station and may further select one additional precoding matrix based on a relationship between antenna port groups of the base station.

In an embodiment, the processor 2430 may receive the CSI-RS from the base station, may generate the feedback information based on the received CSI-RS, and may transmit the generated feedback information to the base station. In this case, the processor 2430 may select one precoding matrix for all antenna port groups of the base station, and may select and report a CQI having different reliability by considering a configured CQI table type or CQI reliability. Also, the processor 2430 may receive the feedback configuration information from the base station, may receive the CSI-RS from the base station, may generate the feedback information based on the received feedback configuration information and the received CSI-RS, and may transmit the generated feedback information to the base station. In this case, the processor 2430 may receive additional feedback configuration information based on a relationship between antenna port groups and the feedback configuration information corresponding to each antenna port group of the base station.

Figure 25:
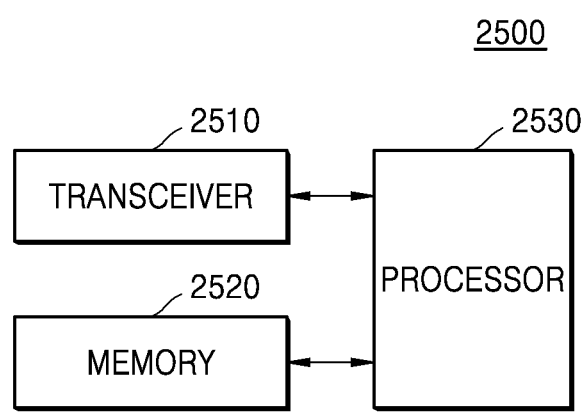
FIG. 25 is a block diagram illustrating a configuration of a base station according to an embodiment.

FIG. 25 is a block diagram illustrating a configuration of a base station according to an embodiment.

Referring to FIG. 25, a base station 2500 may include a transceiver 2510, a memory 2520, and a processor 2530. The transceiver 2510, the memory 2520, and the processor 2530 of the base station 2500 may operate according to a communication method of the base station 2500. However, elements of the base station 2500 are not limited to those illustrated in FIG. 25. For example, the base station 2500 may include elements more or fewer than those illustrated in FIG. 25. In addition, the transceiver 2510, the memory 2520, and the processor 2530 may be implemented as one chip.

The transceiver 2510 may transmit/receive a signal to/from a terminal. The signal may include control information and data. To this end, the transceiver 2510 may include an RF transmitter that up-converts and amplifies a frequency of a transmitted signal and an RF receiver that performs low-noise amplification on a received signal and down-converts a frequency. However, this is an example of the transceiver 2510, and elements of the transceiver 2510 are not limited to the RF transmitter and the RF receiver. Also, the transceiver 2510 may receive a signal through a wireless channel, may output the signal to the processor 2530, and may transmit a signal output from the processor 2530 through the wireless channel.

In an embodiment, the transceiver 2510 transmits/receives data, a reference signal, and feedback information to/from the terminal. The transceiver 2510 transmits a CSI-RS to the terminal through an allocated resource under the control of the processor 2530, and receives a feedback for channel information from the terminal. Also, the terminal transmits a reference signal based on a CRI, a rank, a part of PMI information, and a CQI obtained from channel state information transmitted by the terminal.

The memory 2520 may store a program and data necessary to operate the base station 2500. Also, the memory 2520 may store control information or data included in a signal obtained by the base station 2500. The memory 2520 may include a storage medium such as a ROM, a RAM, a hard disk, a CD-ROM, or a DVD, or a combination of storage media. Also, the memory 2520 may include a plurality of memories. In an embodiment, the memory 2520 may store a program for supporting beam-based cooperation communication.

The processor 2530 may control a series of processes so that the base station 2500 operates according to the above embodiment. The processor 2530 may transmit/receive control information, by executing a program stored in the memory 2520. In an embodiment, the processor 2530 allocates, to the terminal, a CSI-RS resource for channel estimation and a related configuration for obtaining resource information and allocates a feedback resource and a feedback timing to the terminal. Also, the processor 2530 allocates a feedback configuration and a feedback timing in order to prevent a collision between feedbacks from multiple terminals and receives and interprets the feedback information configured at the timing.

In an embodiment, the processor 2530 may control the transceiver 2510 to transmit configuration information of each of at least one reference signal to the terminal, or may generate at least one reference signal. Also, the processor 2530 may control the transceiver 2510 to transmit feedback configuration information for generating the feedback information according to a measurement result to the terminal. Also, the processor 2530 may control the transceiver 2510 to transmit at least one reference signal to the terminal and receive the feedback information transmitted from the terminal at the feedback timing according to the feedback configuration information. Also, the processor 2530 may transmit the feedback configuration information to the terminal, may transmit the CSI-RS to the terminal, and may receive, from the terminal, the feedback information (information including a CQI having different reliability by considering a configured CQI table type or CQI reliability) generated based on the feedback configuration information and the CSI-RS. In this case, the processor 2530 may transmit additional feedback configuration information based on a relationship between antenna port groups and the feedback configuration information corresponding to each antenna port group of the base station. Also, the processor 2530 may transmit a CSI-RS beamformed based on the feedback information to the terminal, and may receive the feedback information generated based on the CSI-RS from the terminal. According to an embodiment of the disclosure, the base station having a large number of transmission antennas of a two-dimensional array structure may prevent excessive feedback resource allocation for CSI-RS transmission and may prevent an increase in the channel estimation complexity of the terminal, and the terminal may effectively measure all channels for a large number of transmission antennas, may compose feedback information based on a measurement result, and may notify the base station of the feedback information.

The present disclosure may, however, be embodied in different forms and should not be construed as limited to embodiments of the present disclosure set forth herein; rather, these embodiments of the present disclosure are provided so that this disclosure is thorough and complete. That is, it will be obvious to one of ordinary skill in the art that various modifications may be made based on the technical scope of the present disclosure. Also, embodiments of the present disclosure may be combined and implemented. For example, parts of an embodiment and another embodiment of the present disclosure may be combined with each other to operate a base station and a terminal. Also, although embodiments of the disclosure are described based on FDD LTE systems, modifications based on the technical scope of the embodiments of the disclosure may also be applied to other systems such as TDD LTE systems and 5G or NR systems.

The invention claimed is:

1. A method, performed by a terminal, of transmitting and receiving control information in a wireless communication system, the method comprising:
   receiving, from a base station, configuration information on dynamic precoding resource block (PRB) bundling through higher layer signaling;
   receiving, from the base station, downlink control information (DCI) including a PRB bundling size indicator;
   in case that the PRB bundling size indicator indicates '0', setting a PRB bundling size by using one value configured based on the received configuration information;
   in case that the PRB bundling size indicator indicates '1':
     determining one of two values configured based on the received configuration information, by comparing a scheduled PRB size and a threshold value related with a bandwidth part size, and
     setting the PRB bundling size by using the determined value; and
   receiving, from the base station, data scheduled by the DCI based on the set PRB bundling size.

2. The method of claim 1,
   wherein the two values are '2 and scheduled bandwidth' or '4 and scheduled bandwidth', and
   wherein the determining of the one of the two values comprises:
     in case that the scheduled PRB size is greater than the threshold value, determining the PRB bundling size as a same size as the scheduled bandwidth, and
     in case that the scheduled PRB size is equal to or less than the threshold value, determining the PRB bundling size as other value rather than the scheduled bandwidth among the two values.

3. The method of claim 2, wherein, in case that the PRB bundling size is determined as the same size as the scheduled bandwidth, assuming that a same precoding is applied to PRBs where data is located.

4. A method, performed by a base station, of transmitting and receiving control information in a wireless communication system, the method comprising:
   transmitting, to a terminal, configuration information on dynamic precoding resource block (PRB) bundling through higher layer signaling;
   in case that a PRB bundling size is determined by using one value configured based on the configuration information, determining a PRB bundling size indicator to indicate '0';
   in case that the PRB bundling size is determined by using one of two values configured based on the configuration information, based on a scheduled PRB size and a threshold value related with a bandwidth part size, determining the PRB bundling size indicator to indicate '1';
   transmitting, to the terminal, downlink control information (DCI) including the PRB bundling size indicator; and
   transmitting, to the terminal, data scheduled by the DCI based on the determined PRB bundling size.

5. The method of claim 4,
   wherein the two values are '2 and scheduled bandwidth' or '4 and scheduled bandwidth', wherein, in case that the scheduled PRB size is greater than the threshold value, the PRB bundling size is determined as a same size as the scheduled bandwidths, and wherein, in case that the scheduled PRB size is equal to or less than the threshold value, the PRB bundling size is determined as other value rather than the scheduled bandwidth among the two values.

6. The method of claim 5, wherein, in case that the PRB bundling size is determined as the same size as the scheduled bandwidth, a same precoding is applied to PRBs where data is located.

7. A terminal for transmitting and receiving control information in a wireless communication system, the terminal comprising:
a transceiver; and
a processor coupled with the transceiver and configured to:
receive, from a base station, configuration information on dynamic precoding resource block (PRB) bundling through higher layer signaling,
receive, from the base station, downlink control information (DCI) including a PRB bundling size indicator,
in case that the PRB bundling size indicator indicates '0', set a PRB bundling size by using one value configured based on the received configuration information,
in case that the PRB bundling size indicator indicates '1':
determine one of two values configured based on the received configuration information, by comparing a scheduled PRB size and a threshold value related with a bandwidth part size; and
set the PRB bundling size by using the determined value, and
receive, from the base station, data scheduled by the DCI based on the set PRB bundling size.

8. The terminal of claim 7,
wherein the two values are '2 and scheduled bandwidth' or '4 and scheduled bandwidth', and
wherein the processor is further configured to:
in case that the scheduled PRB size is greater than the threshold value, determine the PRB bundling size as a same size as the scheduled bandwidth, and
in case that the scheduled PRB size is equal to or less than the threshold value, determine the PRB bundling size as other value rather than the scheduled bandwidth among the two values.

9. The terminal of claim 8, wherein the processor is further configured to:
in case that the PRB bundling size is determined as the same size as the scheduled bandwidth, assume that a same precoding is applied to PRBs where data is located.

10. A base station for transmitting and receiving control information in a wireless communication system, the base station comprising:
a transceiver; and
a processor coupled with the transceiver and configured to:
transmit, to a terminal, configuration information on dynamic precoding resource block (PRB) bundling through higher layer signaling,
in case that a PRB bundling size is determined by using one value configured based on the configuration information, determine a PRB bundling size indicator to indicate '0',
in case that the PRB bundling size is determined by using one of two values configured based on the configuration information, based on a scheduled PRB size and a threshold value related with a bandwidth part size, determine the PRB bundling size indicator to indicate '1',
transmit, to the terminal, downlink control information (DCI) including the PRB bundling size indicator, and
transmit, to the terminal, data scheduled by the DCI based on the determined PRB bundling size.

11. The base station of claim 10,
wherein the two values are '2 and scheduled bandwidth' or '4 and scheduled bandwidth',
wherein, in case that the scheduled PRB size is greater than the threshold value, the PRB bundling size is determined as the same size as the scheduled bandwidth, and
wherein, in case that the scheduled PRB size is equal to or less than the threshold value, the PRB bundling size is determined as other value rather than the scheduled bandwidth among the two values.

12. The base station of claim 11, wherein, in case that the PRB bundling size is determined as the same size as the scheduled bandwidth, a same precoding is applied to PRBs where data is located.

* * * * *